United States Patent
Tokimasa et al.

(10) Patent No.: US 8,401,757 B2
(45) Date of Patent: Mar. 19, 2013

(54) RUNNING CONTROL APPARATUS AND RUNNING CONTROL PROGRAM FOR THE APPARATUS

(75) Inventors: Mitsuhiro Tokimasa, Kariya (JP); Hajime Kumabe, Kariya (JP); Satoshi Niwa, Nagoya (JP); Shotaro Fukuda, Oobu (JP); Masayoshi Takeda, Kariya (JP); Shintaro Osaki, Nisshin (JP)

(73) Assignees: DENSO CORPORATION, Kariya (JP); Advics Co., Ltd., Aichi-pref. (JP)

( * ) Notice: Subject to any disclaimer, the term of this patent is extended or adjusted under 35 U.S.C. 154(b) by 458 days.

(21) Appl. No.: 12/591,750

(22) Filed: Nov. 30, 2009

(65) Prior Publication Data
US 2010/0138123 A1    Jun. 3, 2010

(30) Foreign Application Priority Data
Dec. 2, 2008 (JP) ................... 2008-307552

(51) Int. Cl.
G06F 7/70 (2006.01)
G06F 19/00 (2011.01)
G06G 7/00 (2006.01)
G06G 7/76 (2006.01)

(52) U.S. Cl. ......................................... 701/70
(58) Field of Classification Search .............. 701/70
See application file for complete search history.

(56) References Cited

U.S. PATENT DOCUMENTS

| | | | | |
|---|---|---|---|---|
| 4,884,203 A | | 11/1989 | Preis et al. | |
| 5,024,284 A | * | 6/1991 | Nakano et al. ............. | 180/179 |
| 5,792,021 A | * | 8/1998 | Minowa et al. ............. | 477/106 |
| 5,816,669 A | * | 10/1998 | Hiwatashi et al. .......... | 303/140 |
| 6,077,191 A | * | 6/2000 | Minowa et al. ............. | 477/109 |
| 6,090,011 A | * | 7/2000 | Minowa et al. ............. | 477/107 |
| 6,679,807 B2 | * | 1/2004 | Kato et al. ................. | 477/107 |
| 2002/0038647 A1 | * | 4/2002 | Tashiro et al. ............. | 123/350 |

(Continued)

FOREIGN PATENT DOCUMENTS

DE    21 31 249    12/1972
DE    37 03 645    8/1988

(Continued)

OTHER PUBLICATIONS

Office Action dated May 16, 2012 in corresponding DE Application No. 10 2009 056 130.7 (and English translation).

(Continued)

*Primary Examiner* — Khoi Tran
*Assistant Examiner* — Nicholas Kiswanto
(74) *Attorney, Agent, or Firm* — Posz Law Group, PLC

(57) ABSTRACT

A running control apparatus calculates a target driving or braking torque in a calculating block to control the vehicle driven or braked by this torque at a target speed against a running resistance changed with running circumstances of the vehicle. In a control block, when a driver-required braking torque based on the braking operation of the driver is smaller than the target braking torque, the running control for the vehicle is performed to brake the vehicle by the target braking torque. When the driver-required braking torque becomes higher than the target braking torque, the running control is stopped, and the driver manually brakes the vehicle by the driver-required braking torque. When the driver-required braking torque is decreased to be lower than the target braking torque or a predetermined braking torque corresponding to the release of the braking operation, the running control is restarted.

20 Claims, 11 Drawing Sheets

U.S. PATENT DOCUMENTS

| | | | |
|---|---|---|---|
| 2002/0107106 A1* | 8/2002 | Kato et al. | 477/110 |
| 2004/0251065 A1* | 12/2004 | Komiyama et al. | 180/65.4 |
| 2005/0182549 A1 | 8/2005 | Seki | |
| 2007/0067087 A1 | 3/2007 | Ohshima | |
| 2009/0048755 A1 | 2/2009 | Tokimasa et al. | |
| 2009/0255746 A1* | 10/2009 | Boesch | 180/197 |
| 2009/0281704 A1 | 11/2009 | Otake | |

FOREIGN PATENT DOCUMENTS

| | | |
|---|---|---|
| DE | 196 54 769 | 7/1998 |
| DE | 100 21 770 | 11/2001 |
| DE | 10 2006 000 431 | 3/2007 |
| JP | A-2005-255146 | 9/2005 |
| JP | A-2006-188164 | 7/2006 |
| JP | A-2008-055994 | 3/2008 |
| JP | A-2009-018681 | 1/2009 |

OTHER PUBLICATIONS

Office Action dated Dec. 18, 2012 in corresponding JP Application No. 2008-307552 (and partial English translation).

* cited by examiner

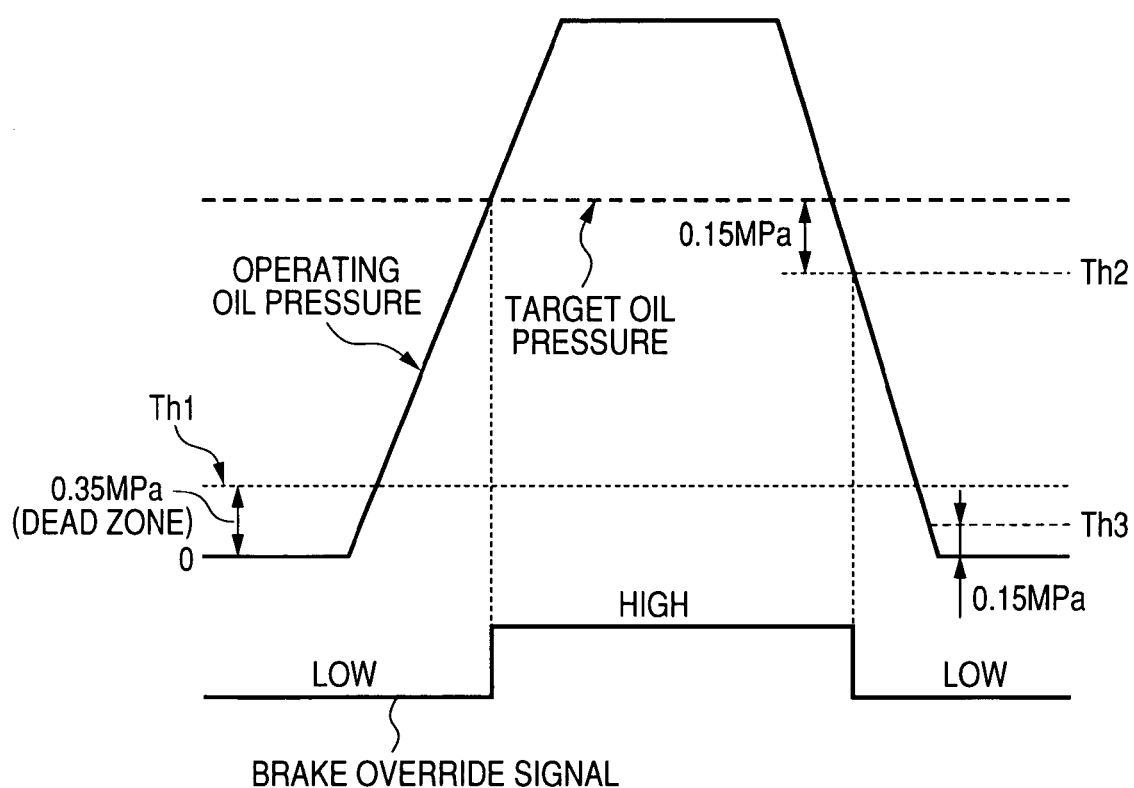

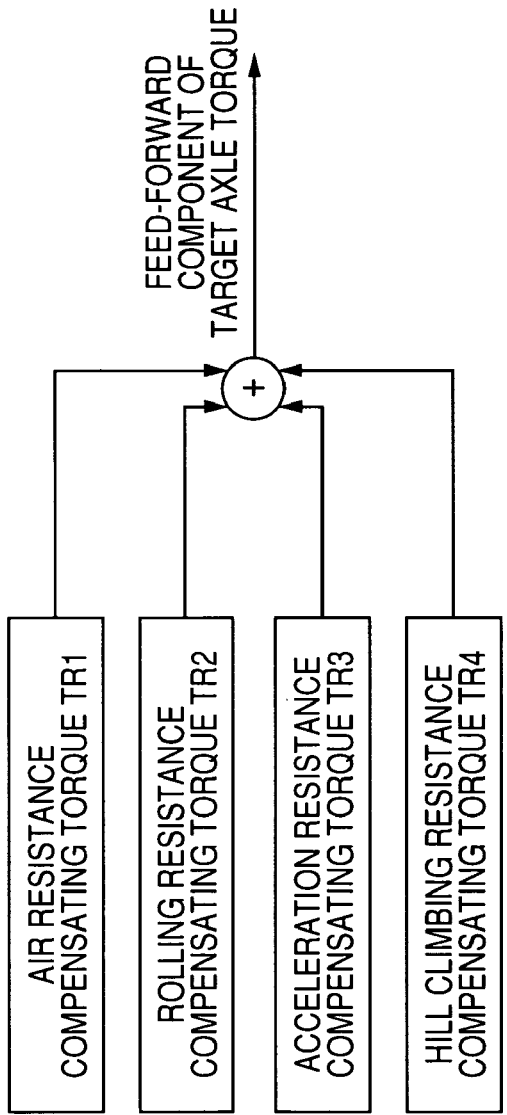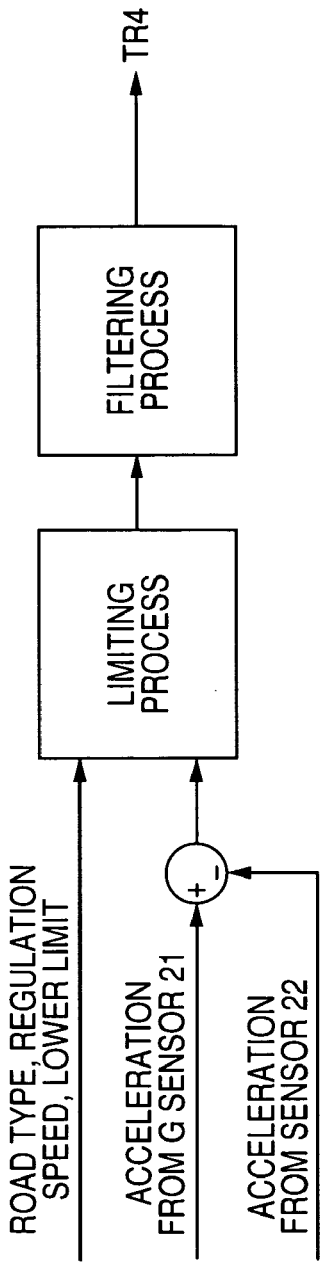

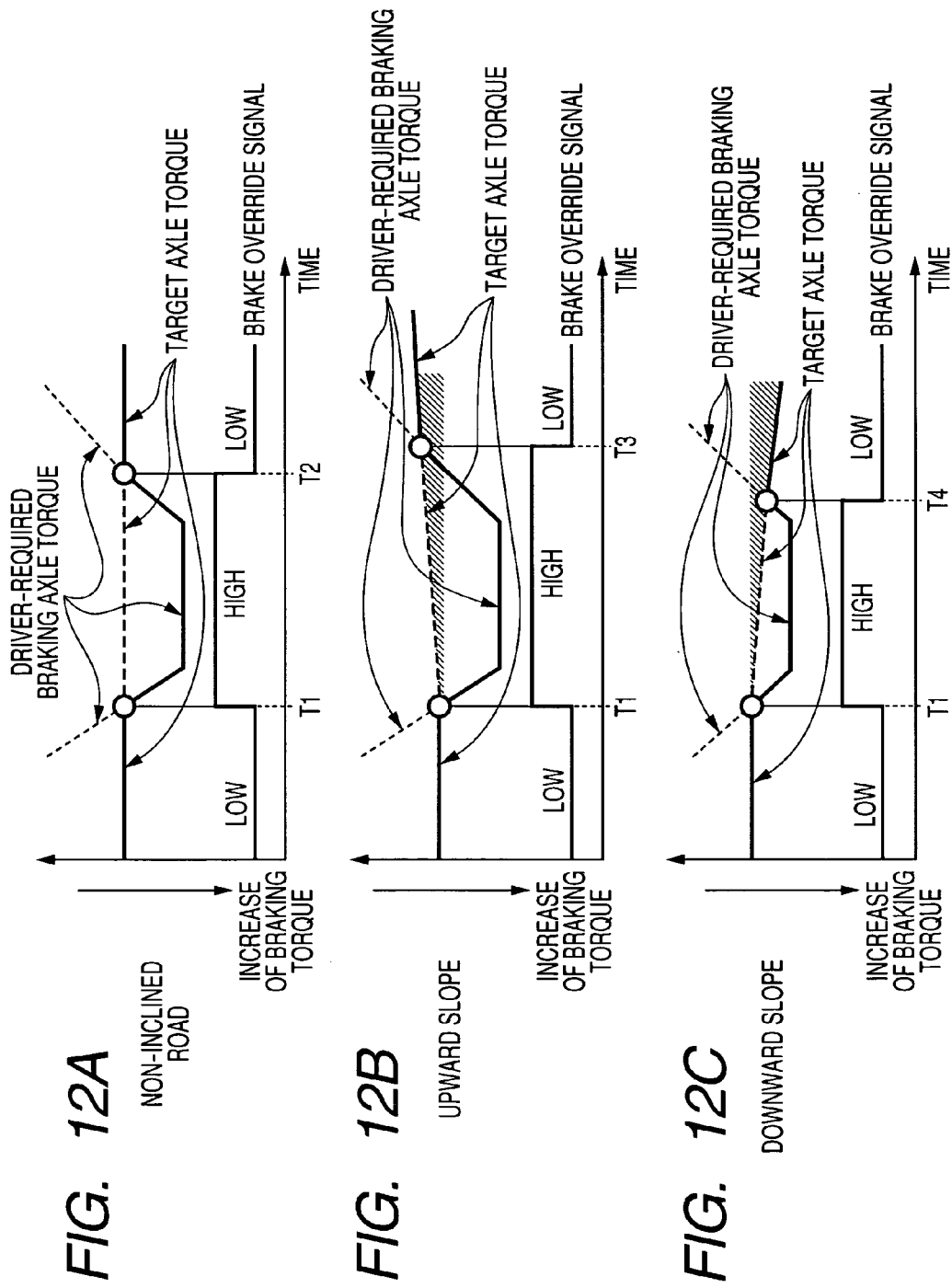

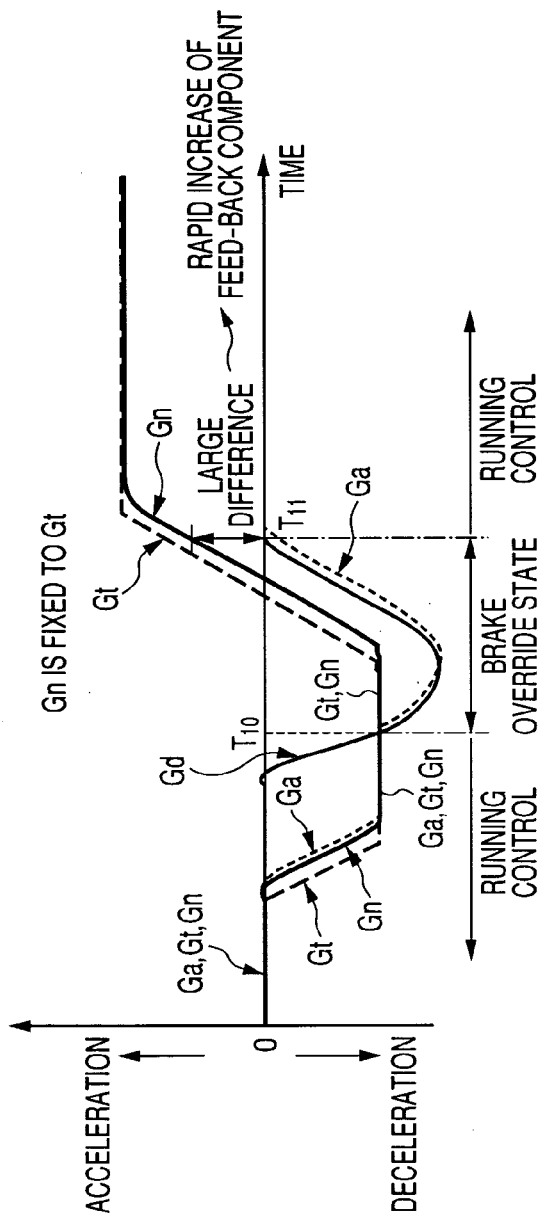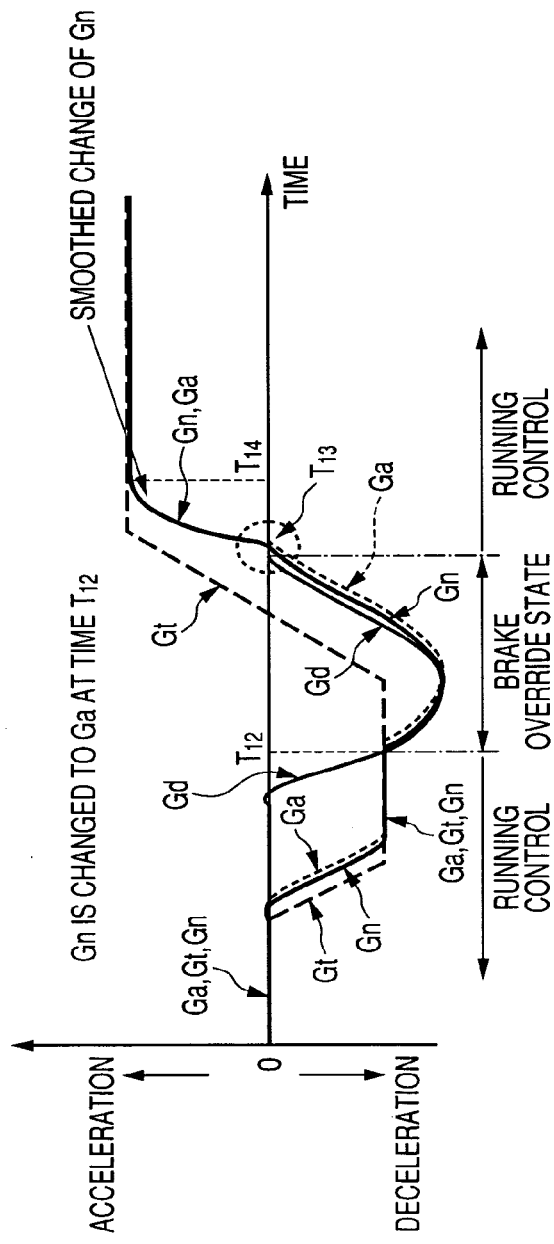

RUNNING CONTROL APPARATUS AND RUNNING CONTROL PROGRAM FOR THE APPARATUS

CROSS-REFERENCE TO RELATED APPLICATION

This application is based upon and claims the benefit of priority of the prior Japanese Patent Application 2008-307552 filed on Dec. 2, 2008, so that the contents of which are incorporated herein by reference.

BACKGROUND OF THE INVENTION

1. Field of the Invention

The present invention relates to a running control apparatus, which controls a vehicle to a target running state, and a running control program executed in a computer to operate this apparatus.

2. Description of Related Art

A running control apparatus is disposed in a vehicle to control an actual speed of the vehicle to a target speed. As the running control of this apparatus, cruise control and adaptive cruise control are, for example, well known. In cruise control, the running speed of the vehicle is maintained to a value set by a driver. In adaptive cruise control, the running speed of the vehicle is automatically controlled to an appropriate value in accordance with information about distance to another vehicle.

In this apparatus, when the driver operates the braking device during the running control, this running control is generally stopped, and the vehicle is run under control of the braking device. Further, the apparatus can be structured such that the running control is restarted when the operation of the braking device is ended.

For example, Published Japanese Patent First Publication No. 2005-255146 discloses a vehicle deceleration control apparatus wherein deceleration control is performed for a present vehicle in accordance with the distance to another vehicle located in front of the present vehicle. In this apparatus, no deceleration control is performed just after the operation of the braking device is finished.

The reason that no deceleration control is performed will be described. When the vehicle is under specific running circumstances just after the end of the braking operation, the deceleration control restarted after the end of the braking operation sometimes causes discomfort to the driver. More specifically, the running vehicle receives a running resistance including a hill climbing resistance in accordance with running circumstances of the vehicle. Therefore, to run the vehicle at a constant speed, it is required to drive the vehicle at a driving force against the running resistance. When deceleration control (representing the running control) stopped during the running of the vehicle on a non-inclined road is, for example, restarted during the running of the vehicle on an upward slope, the running resistance acting on the vehicle at the restart time becomes higher than that at the stop time. In this case, the vehicle is excessively decelerated, so that the running speed of the vehicle undesirably becomes lower than a target value. When acceleration control is performed to quickly heighten the running speed to the target value, the running speed of the vehicle easily exceeds the target value. Therefore, the alternation of the deceleration control and the acceleration control is repeatedly performed to cause hunting in the vehicle engine and to generate vibration of the vehicle body. In contrast, when the deceleration control is restarted during the running of the vehicle on a downward slope, deceleration of the vehicle becomes insufficient. In this case, it takes a long time to lower the running speed to the target value.

SUMMARY OF THE INVENTION

A main object of the present invention is to provide, with due consideration to the drawbacks of the conventional deceleration control apparatus, a running control apparatus wherein running control once stopped is appropriately restarted for a vehicle in accordance with running circumstances of the vehicle.

Further, a subordinate object of the present invention is to provide a running control program executed in a computer of the running control apparatus to appropriately restart the running control of the apparatus once stopped in accordance with running circumstances of the vehicle.

According to the first aspect of this invention, the main object is achieved by the provision of a running control apparatus comprising a control-required driving or braking force calculating unit, a driver-required braking force calculating unit and a running control unit. The control-required driving or braking force calculating unit calculates a control-required driving force or a control-required braking force, required to control a vehicle to a target running state, from a running resistance caused by the vehicle such that the driving or braking force contains a feed-forward component required to run the vehicle at the target running state against the running resistance. The driver-required braking force calculating unit calculates a driver-required braking force of the vehicle required by a braking operation which is performed by a driver of the vehicle. The running control unit performs a running control for the vehicle to run the vehicle by the control-required driving or braking force calculated by the control-required driving or braking force calculating unit. The running control unit stops the running control, when the driver-required braking force is higher than the control-required braking force, to run the vehicle at the driver-required braking force. The running control unit judges, when the driver-required braking force becomes lower than a braking operation release judging threshold, that the braking operation is released. The running control unit restarts the running control when the driver-required braking force becomes lower than the control-required braking force or the braking operation release judging threshold.

With this structure of the apparatus, when the driver-required braking force is equal to or lower than the control-required braking force of the vehicle, the apparatus performs the running control for the vehicle. When the driver-required braking force equal to or lower than the control-required braking force is increased to be higher than the control-required braking force, the apparatus stops the running control to run the vehicle at the driver-required braking force. Then, when the driver-required braking force becomes lower than the control-required braking force or the braking operation release judging threshold, the apparatus restarts the running control.

In this case, the running resistance is changed during the running of the vehicle in accordance with running circumstances (e.g., the running speed, acceleration, weight of the vehicle, and a gradient of the road) of the vehicle. Therefore, the control-required driving or braking force is changed with the running resistance. In this case, the timing at which the running control unit judges that the driver-required braking force becomes lower than the control-required braking force is changed in accordance with the running resistance.

Accordingly, even when the running resistance is changed during the stoppage of the running control, the running control can be restarted at a restart time which is appropriate to the restart of the running control, and the control-required driving or braking force provided by the vehicle at the restart time can be appropriately set at the value corresponding to the running resistance to run the vehicle at the target running state against the running resistance. That is, the running control apparatus can appropriately restart the running control in accordance with running circumstances of the vehicle so as to smoothly restart the running control without causing discomfort to the driver.

The control-required braking force is indicated by a controlled pressure of brake oil. The driver-required braking force is indicated by an operating pressure of the brake oil automatically set in response to the braking operation of the driver.

According to the second aspect of this invention, the subordinate object is achieved by the provision of a running control program, executed in a computer to operate a running control apparatus, comprising a control-required driving or braking force calculating routine, a driver-required braking force calculating routine and a running control routine. The control-required driving or braking force calculating routine calculates a control-required driving force or a control-required braking force, required to control a vehicle to a target running state, from a running resistance caused by the vehicle such that the driving or braking force contains a feed-forward component required to run the vehicle at the target running state against the running resistance. The driver-required braking force calculating routine calculates a driver-required braking force of the vehicle required by a braking operation which is performed by a driver of the vehicle. The running control routine performs a running control for the vehicle to run the vehicle by the control-required driving or braking force calculated by the control-required driving or braking force calculating unit. The running control routine stops the running control, when the driver-required braking force is higher than the control-required braking force, to run the vehicle at the driver-required braking force. The running control routine judges, when the driver-required braking force becomes lower than a braking operation release judging threshold, that the braking operation is released. The running control routine restarts the running control when the driver-required braking force becomes lower than the control-required braking force or the braking operation release judging threshold.

With these routines of the program, the running control apparatus can be reliably operated while using calculation results and control data of the program.

BRIEF DESCRIPTION OF THE DRAWINGS

FIG. 3 is a view showing the judgment on a brake override state performed in a braking operation mediating unit shown in FIG. 2;

FIG. 4 is a view explaining feed-forward calculation of an FF torque calculating unit shown in FIG. 2;

FIG. 5 is a view explaining the calculation of a hill climbing resistance compensating torque performed in the FF torque calculating unit;

FIG. 12A is a view exemplarily showing the restart timing of the running control when the vehicle is run on a non-gradient road;

FIG. 12B is a view exemplarily showing the restart timing of the running control when the road gradient is increased during the stoppage of the running control;

FIG. 12C is a view exemplarily showing the restart timing of the running control when the road gradient is decreased during the stoppage of the running control;

FIG. 13A is a view exemplarily showing the difference between a normative acceleration and an actual acceleration of the vehicle when the normative acceleration is fixed to the target acceleration; and FIG. 13B is a view exemplarily showing the actual acceleration changed to follow the normative acceleration according to this embodiment.

DETAILED DESCRIPTION OF THE PREFERRED EMBODIMENTS

Embodiment of the present invention will now be described with reference to the accompanying drawings.

Embodiment

Figure 1:
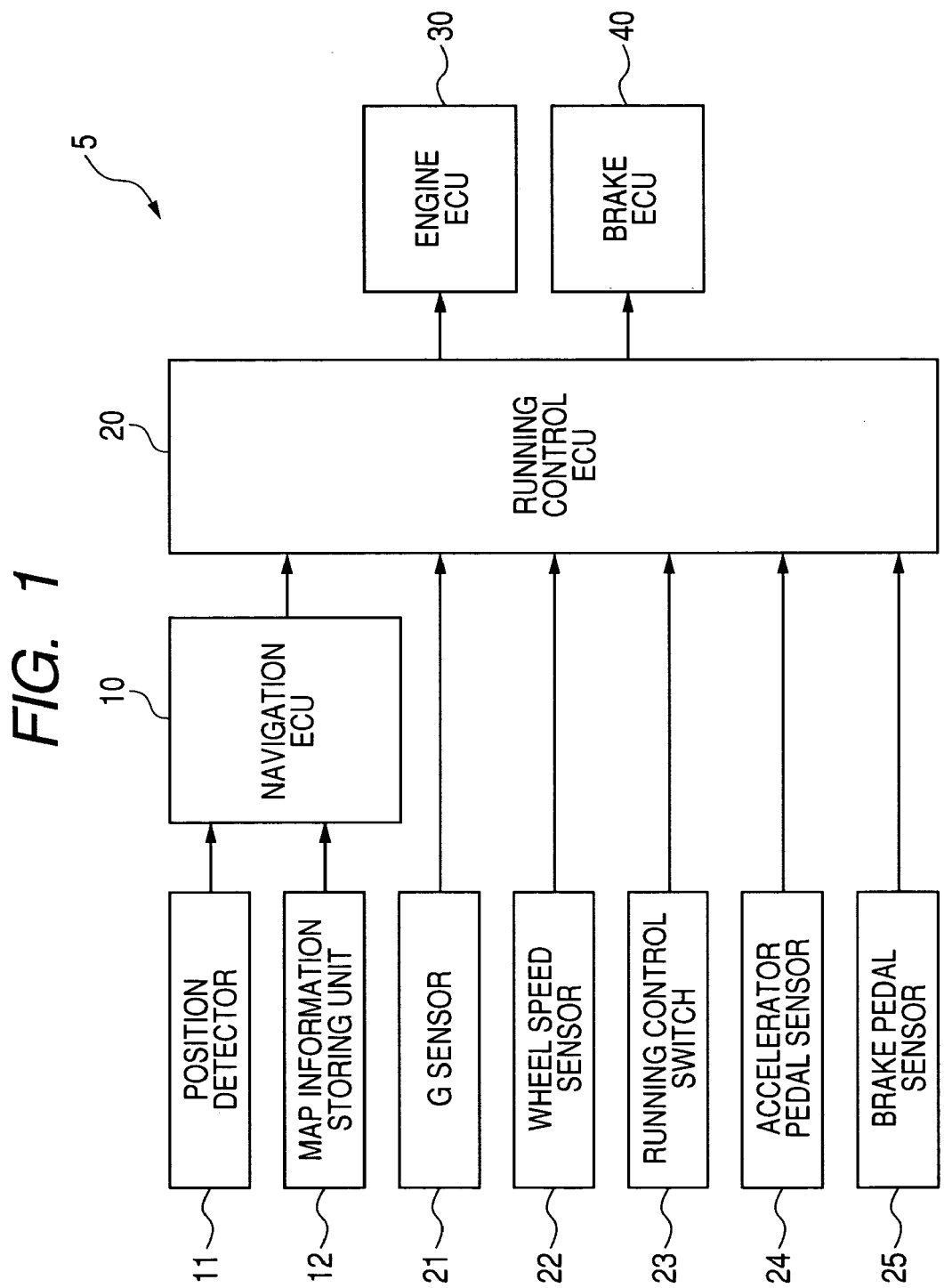
FIG. 1 is a block diagram of a running control apparatus according to the embodiment of the present invention.

FIG. 1 is a block diagram of a running control apparatus according to the embodiment. A running control apparatus 5 shown in FIG. 1 is mounted on a vehicle (not shown) to perform running control for the vehicle.

As shown in FIG. 1, this apparatus 5 has an engine electronic control unit (ECU) 30 for controlling an engine (not shown) of the vehicle to generate a driving torque (or a driving force) in the engine and to transmit the driving torque to a drive axle (not shown) of the vehicle, a brake ECU 40 for controlling a braking device (not shown) of the vehicle to generate a braking torque (or a braking force) in the braking device and to brake the vehicle by the braking torque, and a running control ECU 20. This ECU 20 is composed of an electronic controlled system including a microcomputer, and a running control program is installed in the microcomputer. The ECU 20 is operated by executing this program.

The ECU 20 automatically calculates a running resistance which is caused in the vehicle run at a target speed (or a target running state) and is changeable with running circumstances of the vehicle. The ECU 20 automatically performs feed-forward calculation in accordance with the running resistance to compensate a torque corresponding to the running resistance of the vehicle with a feed-forward component of a target axle torque obtained in the feed-forward calculation and to maintain the vehicle, driven or braked by the feed-forward component, to the target speed against the running resistance.

The ECU 20 automatically performs feed-back calculation based on the difference between a target acceleration and an actual acceleration of the vehicle to calculate a feed-back component of the target axle torque as a correction of the target axle torque and to control the vehicle, driven or braked by the target axle torque composed of the feed-forward component and the feed-back component, to the target acceleration so as to run the vehicle at the target speed against the running resistance. The target axle torque is called as a target driving axle torque when the vehicle is driven by the target axle torque. The target axle torque is called as a target braking axle torque (or a control-required braking force) when the vehicle is braked by the target axle torque. The ECU 20 automatically calculates a driver-required driving axle torque in accordance with the stroke position of an accelerator pedal moved by the driving operation of the driver. The ECU 20 automatically calculates a driver-required braking axle torque (or a driver-required braking force provided by a braking device in accordance with the braking operation of the driver) in accordance with the position of a brake pedal moved by the braking operation of the driver; performs a running control for the vehicle by controlling the ECU 30 or ECU 40 such that the vehicle is run by the target driving or braking axle torque under control of the ECU 30 or ECU 40. The ECU 20 stops the running control, when the driver-required driving axle torque exceeds the target driving axle torque or when the driver-required braking axle torque exceeds the target braking axle torque, to drive the vehicle by the driver-required driving axle torque under control of the ECU 30 or to brake the vehicle by the driver-required braking axle torque under control of the ECU 40. The ECU 20 restarts the running control for the vehicle when the driver-required driving or braking axle torque becomes lower than the target driving or braking axle torque or a specific driving or braking axle torque lower than the target driving or braking axle torque or when the release of the braking operation is detected.

The running resistance is changed with running circumstances of the vehicle. The running resistance is composed of a rolling resistance, an air resistance, a hill climbing resistance and an acceleration resistance. During the running of the vehicle, the vehicle receives the rolling resistance and the air resistance from the running road and atmosphere so as to decelerate the vehicle. Each of the rolling resistance and the air resistance is increased with the running speed of the vehicle. During the running of the vehicle on an upward slope, the vehicle receives the hill climbing resistance so as to decelerate the vehicle. During the running of the vehicle on a downward slope, the vehicle receives the hill climbing resistance having a negative value so as to accelerate the vehicle. Therefore, the hill climbing resistance is considerably changed with the gradient of the road. During the acceleration of the vehicle, the vehicle receives inertia torque of the vehicle as the acceleration resistance to resist accelerating the vehicle. During the deceleration of the vehicle, the vehicle receives inertia torque of the vehicle as the acceleration resistance having a negative value to resist decelerating the vehicle.

To continue running the vehicle at a target speed, it is required to drive the vehicle against the running resistance having a positive value or to brake the vehicle against the running resistance having a negative value. Therefore, the vehicle needs the feed-forward component of the target axle torque.

Further, even when the vehicle is driven or braked by the feed-forward component of the target axle torque, the actual speed of the vehicle is sometimes differentiated from the target speed. Therefore, it is sometimes required to correct the target axle torque based on the feed-forward calculation by a feed-back component obtained in the feed-back calculation. In this embodiment, the feed-back calculation is performed based on the difference between the actual acceleration or deceleration of the vehicle and a target acceleration or deceleration, required to quickly reach the target speed. Therefore, the actual acceleration or deceleration of the vehicle driven or braked by the target axle torque containing the feed-back component is changed to follow the target acceleration or deceleration, and the vehicle is controlled to the target speed.

During the running control of the ECU 20, the ECU 30 receives information about the target driving axle torque from the ECU 20 and controls the engine to generate the target driving axle torque and to transmit this torque to the axle of the vehicle. Therefore, the vehicle driven by the target driving axle torque is accelerated or decelerated to maintain the target speed against the running resistance. Further, the ECU 40 receives information about the target braking axle torque from the ECU 20 and controls the braking device to give the target braking axle torque to wheels of the vehicle. Therefore, the vehicle is accelerated or decelerated to maintain the target speed against the running resistance. Accordingly, when the driver manually performs no driving or braking operation, the vehicle can continue running at the target speed under the running control of the ECU 20 while repeating acceleration and deceleration of the vehicle.

The calculations of the axle torques is performed by the execution of the program. The ECU 20 are operated according to control data produced in the program to perform the running control for the vehicle, the stoppage of the running control, the manual braking operation based on the braking operation and the restart of the running control.

The apparatus 5 further has a position detector 11 for detecting a present position of the vehicle from data received in a global positioning system (GPS) receiver (not shown) or data obtained in a gyroscope or distance sensor (not shown), a map information storing unit 12 for storing map information, and a navigation ECU 10 for specifying a present road, on which the vehicle is now running, from the present position of the detector 11 and the map information of the unit 12 and producing information (e.g., speed limit) about the present road. The apparatus 5 further has a G sensor 21 for detecting an acceleration acting on the vehicle in the direction from the front to rear side of the vehicle, a wheel speed sensor 22 for detecting the rotational speed of one wheel of the vehicle, a running control switch 23 operated by the driver to manually start and stop the running control (e.g., cruise control or adaptive cruise control), an accelerator pedal sensor (or acceleration stroke sensor) 24 for detecting the stroke position of the accelerator pedal moved by the accelerating operation of the driver, and a brake pedal sensor 25 for detecting the position of the brake pedal moved by the braking operation of the driver from the pressure of a brake oil.

The ECU 20 calculates an actual running speed and an actual acceleration (or deceleration) of the vehicle from data detected in the wheel speed sensor 22. This acceleration does not include the gravitational acceleration. When the vehicle is run on an upward or downward slope, the acceleration detected in the G sensor 21 includes influence of the gravitational acceleration. Therefore, the difference between the accelerations of the sensors 21 and 22 indicates the hill climbing resistance included in the running resistance.

In response to the turn-on state of the switch 23, the ECU 20 calculates a target axle torque as a target driving or braking axle torque from the information of the ECU 10 and data detected in the sensors 21 and 22 and starts the running control for the vehicle to automatically drive or brake the vehicle by the target driving or braking axle torque under control of the ECU 20. In response to the turn-off state of the switch 23, the ECU 20 stops the running control, and the driver manually drives the vehicle.

In response to the accelerating operation of the driver, the ECU 20 calculates the driver-required driving axle torque from the stroke position of the accelerator pedal detected by the sensor 24. In response to the braking operation of the driver, the ECU 20 calculates the driver-required braking axle torque from the position of the brake pedal detected by the sensor 25. In response to the driver-required braking axle torque becoming higher than the target braking axle torque, the ECU 20 stops the running control. In response to the driver-required braking axle torque becoming lower than the target braking axle torque or the stoppage of the braking operation of the driver, the ECU 20 restarts the running control.

Next, the operation of the ECU 20 is now described below in detail.

Figure 2:
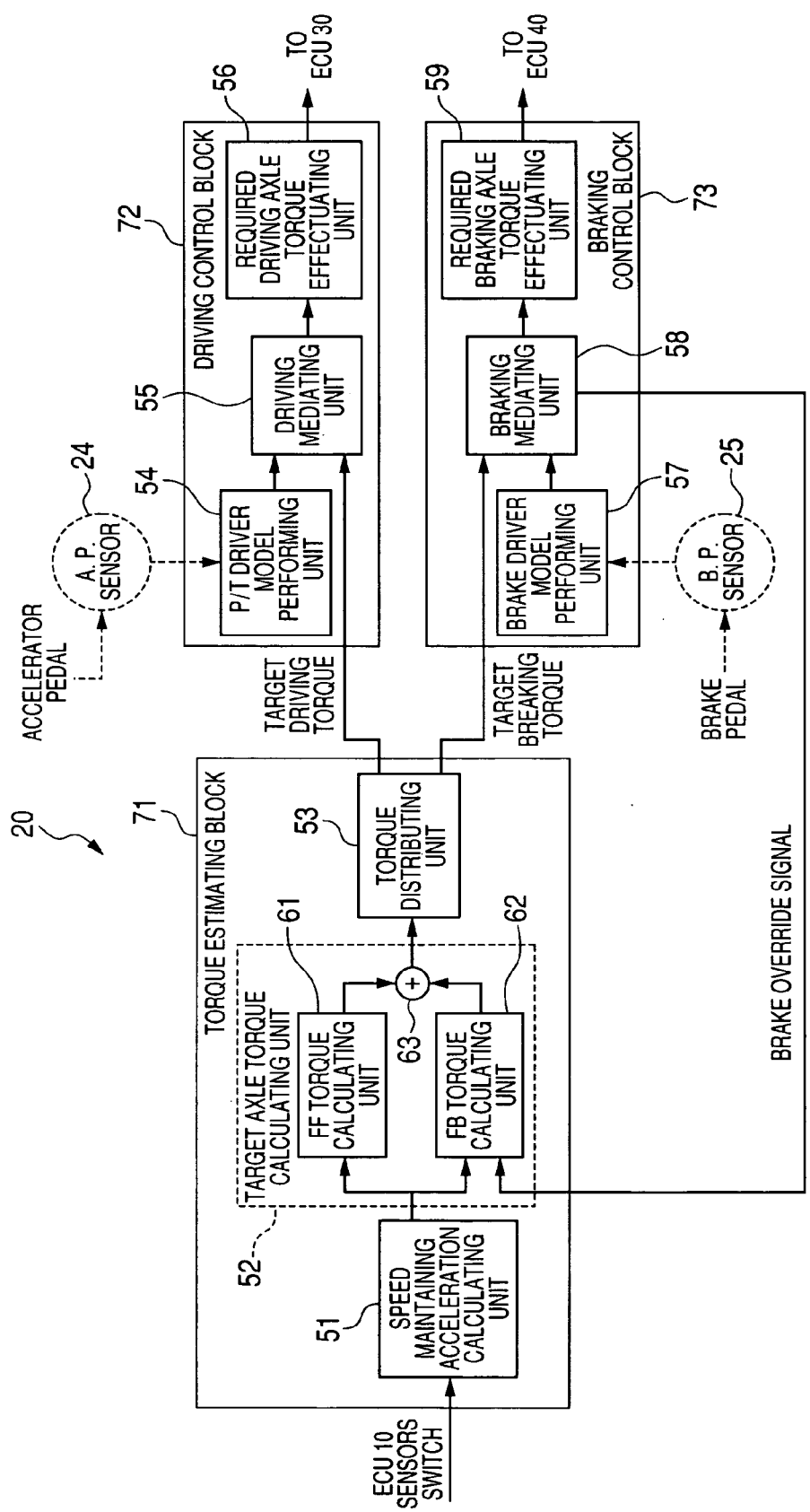
FIG. 2 is a block diagram of a running control ECU of the apparatus shown in FIG. 1.

FIG. 2 is a block diagram of the running control ECU 20. As shown in FIG. 2, the ECU 20 has a torque estimating block 71, a driving control block 72, and a braking control block 73. The block 71 estimates a target axle torque (control-required driving or braking force) as a target driving or braking axle torque to be applied to the axle or wheel of the vehicle. When the vehicle is driven or braked by the target driving or braking axle torque under the running control of the apparatus 5, the vehicle is controlled to the target speed. The block 72 determines either the target driving axle torque of the block 71 or the driver-required driving axle torque obtained from data of the sensor 24 as a required driving axle torque and performs a driving control for the vehicle to be driven by the required driving axle torque. The block 73 determines either the target braking axle torque of the block 71 or the driver-required braking axle torque obtained from data of the sensor 25 as a required braking axle torque and performs a braking control for the vehicle to be braked by the required braking axle torque.

The block 71 has a speed maintaining acceleration calculating unit 51, a target axle torque calculating unit 52 (i.e., driving or braking force calculating unit of claims), and a torque distributing unit 53. The unit 51 calculates a target speed of the vehicle in accordance with an instruction of the driver or running circumstances of the vehicle, calculates the actual speed and the actual acceleration of the vehicle from data of the sensor 22, and calculates a target acceleration (including deceleration), required to control the actual speed of the vehicle to the target speed, from the actual speed and the actual acceleration.

The unit 52 calculates a target axle torque (i.e., a control-required driving or braking force) required to control the vehicle to the target speed against the running resistance. More specifically, the unit 52 has a feed-forward (FF) torque calculating unit 61, a feed-back (FB) torque calculating unit 62, and an adder 63. The unit 61 performs feed-forward calculation while using the actual speed and accelerations derived from data of the sensors 21 and 22 and obtains a feed-forward component of the target axle torque required to continue running the vehicle at the target speed against the running resistance.

The unit 62 performs feed-back calculation, based on the difference between the target acceleration and the actual acceleration of the vehicle, in the running control and obtains a feed-back component of the target axle torque as a correction of the target axle torque. The adder 63 adds the feed-forward component and the feed-back component together to obtain the target axle torque.

The unit 53 distributes the target axle torque to the blocks 72 and 73. When the target axle torque has a positive value, the block 72 receives the target axle torque as a target driving axle torque. When the target axle torque has a negative value, the block 73 receives the absolute value of the target axle torque as a target braking axle torque (i.e., control-required braking force of claims).

The block 72 has a P/T driver model performing unit 54, a driving mediating unit 55 (i.e., running control unit of claims), and a required driving axle torque effectuating unit 56 (i.e., running control unit of claims). The unit 54 calculates a driving axle torque corresponding to the stroke position of the accelerator pedal detected in the sensor 24 as a driver-required driving axle torque. The unit 55 mediates between the target driving axle torque of the block 71 and the driver-required driving axle torque of the unit 54. More specifically, the unit 55 selects the target driving axle torque when this torque is equal to or larger than the driver-required driving axle torque and selects the driver-required driving axle torque when this torque is larger than the target driving axle torque. The unit 56 receives the driving axle torque selected in the unit 55 as a required driving axle torque, produces a driving control signal indicating the required driving axle torque and outputs this signal to the engine ECU 30. The engine ECU 30 controls the engine of the vehicle to generate the required driving axle torque and to drive the vehicle by the required driving axle torque. Therefore, the vehicle is driven at the target speed or a driver-required speed under control of the ECU 20 and ECU 30.

The block 73 has a brake driver model performing unit 57 (i.e., a driver-required braking force calculating unit of claims), a braking operation mediating unit 58 (i.e., running control unit of claims), and a required braking axle torque effectuating unit 59 (i.e., running control unit of claims). The unit 57 calculates a braking axle torque corresponding to the position of the brake pedal detected in the sensor 25 as a driver-required braking axle torque (i.e., driver-required braking force). The unit 58 mediates between the controlled braking operation based on the target braking axle torque of the block 71 and the driver's braking operation based on the driver-required braking axle torque of the unit 57. More specifically, the unit 58 compares the driver-required braking axle torque with the target braking axle torque. When the driver-required braking axle torque is lower than or equal to the target braking axle torque, the unit 58 selects the target braking axle torque and outputs a brake override signal set at the low level to the unit 62. This signal of the low level indicates that the ECU 20 is set in the running control state. In contrast, when the driver-required braking axle torque exceeds the target braking axle torque, the unit 58 selects the driver-required braking axle torque and outputs a brake override signal set at the high level to the unit 62. This signal of the high level indicates that the ECU 20 is set in the brake override state. When the driver-required braking axle torque exceeding the target braking axle torque is decreased to be lower than the target braking axle torque or when the unit 58 detects the release of the driver's braking operation, the unit 58 again selects the target braking axle torque and outputs the brake override signal set at the low level to the unit 62.

The unit 59 receives the braking axle torque selected in the unit 58 as a required braking axle torque, produces a braking control signal indicating the required braking axle torque and outputs this signal to the brake ECU 40. The brake ECU 40 controls the braking device of the vehicle according to the signal.

Therefore, when the driver-required braking axle torque is lower than or equal to the target braking axle torque, the ECU 20 performs the running control for the vehicle. In this running control, under control of the ECU 20, the vehicle is braked by the target braking axle torque and is automatically controlled to the target speed against the running resistance. When the driver-required braking axle torque exceeds the target braking axle torque, the ECU 20 stops the running control and allows the driver to manually brake the vehicle by the driver-required braking axle torque. When the driver-required braking axle torque exceeding the target braking axle torque is decreased to be lower than the target braking axle torque or when the unit 58 detects the release of the driver's braking operation, the ECU 20 restarts the running control.

The judgment on the brake override state performed in the braking operation mediating unit 58 will be described below with reference to FIG. 3. FIG. 3 is a view showing the judgment on the brake override state.

As shown in FIG. 3, as the brake pedal is moved down in response to the driver's braking operation, the pressure of the brake oil initially placed at zero is gradually increased. This pressure based on the driver's braking operation is called an operating oil pressure corresponding to the driver-required braking force. The pressure of the brake oil required to obtain the target braking axle torque is called a target oil pressure corresponding to the control-required braking force.

A braking operation judging threshold Th1 of the brake oil pressure is preset to be higher than 0 MPa and to be lower than the target oil pressure. When the operating oil pressure becomes higher than the threshold Th1, the unit 58 judges that the driver is now performing the braking operation. The oil pressure having a low value is sometimes incorrectly detected due to the zero point shifting. To prevent the judgment based on the oil pressure incorrectly detected, the threshold Th1 is, for example, preset at 0.35 MPa, which is slightly higher than 0 MPa.

When the unit 58 judges based on the operating oil pressure that the driver is now performing the braking operation, the unit 58 compares the operating oil pressure and the target oil pressure. When the operating oil pressure is equal to or lower than the target oil pressure, the unit 58 judges that the apparatus 5 should be set in the running control state and sets a brake override signal to the low level. When the operating oil pressure exceeds the target oil pressure, the unit 58 judges that the apparatus 5 should be transferred to the brake override state and sets the brake override signal to the high level. Therefore, when the ECU 20 judges that a driver-required braking force corresponding to the driver-required braking axle torque becomes larger than a control-required braking force corresponding to the target braking axle torque, the running control ECU 20 stops the running control and starts the braking control based on the driver-required braking force.

A brake override state releasing threshold Th2 of the brake oil pressure is preset to be substantially equal to the target oil pressure (i.e., control-required braking force). In this embodiment, the threshold Th2 is set to be slightly lower than the target oil pressure by a predetermined value V1. When the operating oil pressure exceeding the target oil pressure is decreased and becomes lower than the threshold Th2, the unit 58 judges that the brake override state should be released or ended, and sets the brake override signal to the low level. Assuming that the threshold Th2 is equal to the target oil pressure, hunting is easily caused so as to repeatedly perform the alternation of the brake override state and the running control state. To prevent this hunting, the threshold Th2 is preset to be lower than the target oil pressure by 0.15 MPa (V1=0.15 Mpa).

The unit 58 may judge the release of the brake override state according to a braking operation release judging threshold Th3 of the brake oil pressure, in place of the threshold Th2. More specifically, when the operating oil pressure becomes lower than the threshold Th3, the unit 58 judges that the braking operation of the driver is stopped or ended, and judges that the brake override state should be released. To prevent the hunting such as a repeated alternation of the braking operation judgment and the non-braking operation judgment, the threshold Th3 is, for example, set at 0.15 MPa lower than the threshold Th1.

Therefore, when the ECU 20 judges that the driver-required braking force becomes lower than the control-required braking force or the braking operation release judging threshold Th3, the ECU 20 restarts the running control.

Next, the feed-forward calculation of the FF torque calculating unit 61 will be described with reference to FIG. 4. FIG. 4 is a view explaining the feed-forward calculation.

To control the vehicle to the target speed, it is required to drive or brake the vehicle in compensation for the running resistance composed of air resistance, rolling resistance, acceleration resistance and hill climbing resistance. As shown in FIG. 4, the unit 61 calculates an air resistance compensating torque Tr1 required to compensate the air resistance, a rolling resistance compensating torque Tr2 required to compensate the rolling resistance, an acceleration resistance compensating torque Tr3 required to compensate the acceleration resistance, and a hill climbing resistance compensating torque Tr4 required to compensate the hill climbing resistance. The feed-forward component of the target axle torque is the sum of these torques Tr1 to Tr4.

The torques Tr1 to Tr3 are calculated according to equations (1), (2) and (3).

$$Tr1 = \tfrac{1}{2} \times \rho C d A V^2 \tag{1}$$

$$Tr2 = \mu M g \tag{2}$$

$$Tr3 = M\alpha \tag{3}$$

The symbol $\rho$ (kg/m$^3$) denotes the density of air, the symbol Cd denotes the resistance coefficient of air, the symbol A (m$^2$) denotes the projected area of the vehicle on the front plane, the symbol V (m/s) denotes the target speed of the vehicle, the symbol $\mu$ denotes the resistance coefficient of rolling, the symbol M (kg) denotes the weight of the vehicle, the symbol g (m/s$^2$) denotes the gravitational acceleration, and the symbol $\alpha$ (m/s$^2$) denotes the target acceleration of the vehicle.

The unit 61 calculates the difference between the acceleration of the vehicle detected in the G sensor 21 and the actual acceleration of the vehicle determined based on data of the wheel speed sensor 22. The acceleration of the sensor 21 includes influence of the gravitational acceleration, while the actual acceleration of the sensor 22 has no relation to the gravitational acceleration. Therefore, the calculated difference indicates the gradient or inclination of the road along the running direction. The unit 61 calculates a road gradient and a change of the road gradient from this difference, and calculates the torque Tr4 from the calculated road gradient.

FIG. 5 is a view explaining the calculation of the hill climbing resistance compensating torque Tr4.

When small uneven portions (e.g., bumps and depressions) exist in the road, the G sensor 21 sometimes detects an unnecessary acceleration based on the uneven portions, so that the torque Tr4 cannot be correctly obtained. To correctly determine the torque Tr4, as shown in FIG. 5, the unit 61 performs a limiting process and a filtering process. In the limiting process, the unit 61 judges whether or not the gradient of the road calculated from the difference matches the law about road structure (e.g., Section 20 of the Road Structure Act in Japan). The upper limit of the road gradient is specified in this law, and this limit depends on the road type and the regulation speed (or design speed) allowed for vehicles on the road.

Further, when it is required to change the road gradient (i.e., inclination in vertical section), the law specifies that the road gradient should be gradually changed along a curve defined in vertical section. More specifically, the law specifies the radius of curvature of the curve, and specifies the lower limit of this radius while considering the regulation speed and the shape (e.g., concave or convex shape) of the curve (e.g., Section 22 of the Road Structure Act). The unit 61 calculates a change of the road gradient from data detected in the sensors 21 and 22 and judges whether or not the radius of curvature estimated from the calculated change of the road gradient is lower than the lower limit specified in the law.

Information about the road type, the regulation speed and the lower limit of the radius of curvature is stored in the storing unit 12 and is sent to the ECU 20 through the ECU 10. When the road gradient calculated from the difference exceeds the upper limit of the road gradient specified in the law, the unit 61 judges that, because the vehicle runs on a bump or depression of the road, this calculated gradient does not actually exist in the road. In this case, the calculated difference is not used for the estimation of the torque Tr4, but the torque Tr4 is calculated from the road gradient equal to the upper limit specified in the law. For example, when the upper limit is set at 5% while the calculated road gradient is equal to 10%, the unit 61 calculates the torque Tr4 from the road gradient equal to 5%.

Further, when the estimated radius of curvature of the curve is lower than the lower limit specified in the law, the calculated difference is not used for the estimation of the torque Tr4, but the torque Tr4 is calculated from the road gradient which is curved at the radius of curvature equal to the lower limit.

Therefore, in this embodiment, even when the calculated road gradient or the estimated radius of curvature of the curve is out of the range specified in the law, the unit 61 calculates the torque Tr4 from the value of the road gradient or the radius of curvature of the curve placed in the range and being nearest to the calculated road gradient or the estimated radius of curvature of the curve. However, when the calculated road gradient or the estimated radius of curvature of the curve is out of the range specified in the law, the unit 61 may stop the calculation of the torque Tr4.

Figure 6:
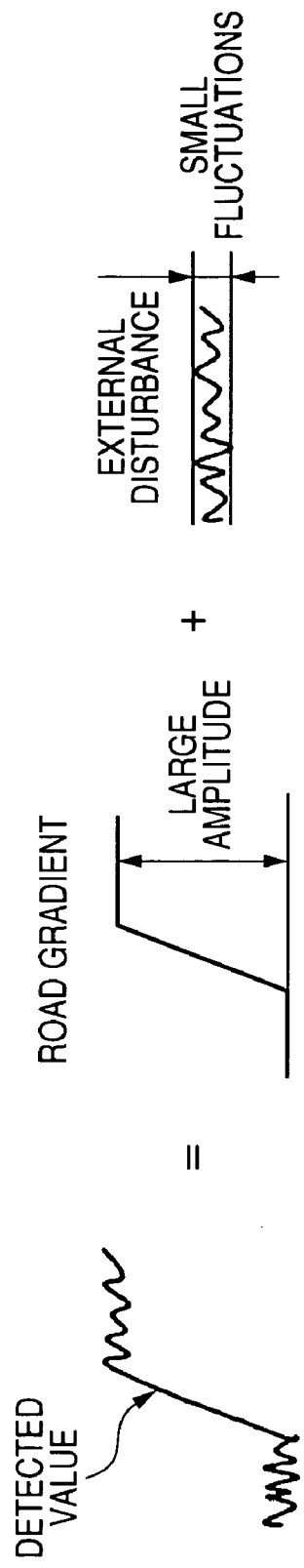
FIG. 6 is a view explaining noise of a road gradient signal to be removed in the calculation shown in FIG. 5.

In the filtering process performed after the limiting process, noise existing in the signal indicating the road gradient is removed. FIG. 6 is a view explaining noise included in a road gradient signal.

As shown in FIG. 6, noise caused by external disturbance is included in the signal of the road gradient, so that the signal level is fluctuated. This noise is removed from the signal in the filtering process. When the time constant used in the filtering process is large, noise of the signal can be efficiently removed, but the detection of a change in the road gradient is undesirably delayed. Therefore, even when the gradient of the actual road is sharply changed, the detected road gradient is gradually changed. As a result, the change in the road gradient cannot be correctly detected. In contrast, when the time constant used in the filtering process is small, the change in the road gradient can be correctly detected, but noise of the signal cannot be efficiently removed. In this embodiment, when the road gradient is substantially constant, the filtering process using a large time constant is performed for the road gradient signal. In contrast, when the road gradient is changed, the filtering process using a small time constant is performed for the road gradient signal.

Figure 7:
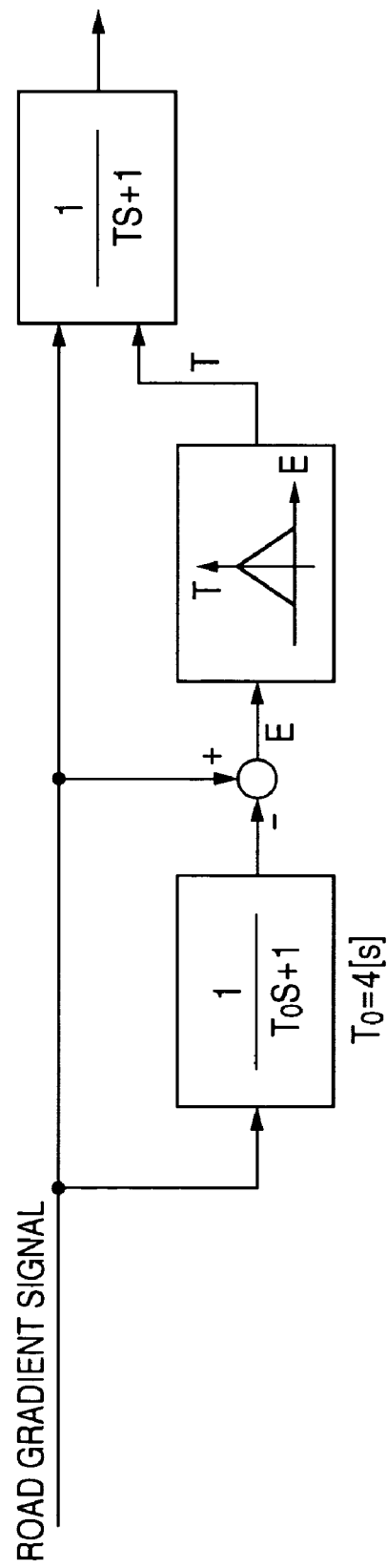
FIG. 7 is a view explaining the filtering process performed for the calculation of the hill climbing resistance shown in FIG. 5.

This filtering process will be described in detail with reference to FIG. 7. FIG. 7 is a view explaining the filtering process of the unit 61.

As shown in FIG. 7, the filtering process using a large time constant $T_0$ (e.g., $T_0$=4 second) is performed for the road gradient signal obtained in the limiting process by multiplying the level of the signal by $1/(T_0 S+1)$ to obtain a processed signal, and the difference E between the road gradient signal and the processed signal is calculated. Then, a time constant T depending on the difference E is set. As the difference E becomes large, the time constant T becomes small. That is, when the difference E is small, the unit 61 judges that the road gradient is sufficiently low, and noise included in the signal of the road gradient is removed in the filtering process using a large time constant T. In contrast, when the difference E is large, the unit 61 judges that a change of the road gradient is large, and a small time constant T is used in the filtering process to sufficiently lower the influence of the filtering process on the change of the road gradient.

Therefore, noise included in the road gradient signal can be effectively removed while the change of the road gradient is correctly detected, and the torque Tr4 is calculated from the road gradient after the limiting process and the filtering process.

Figure 8:
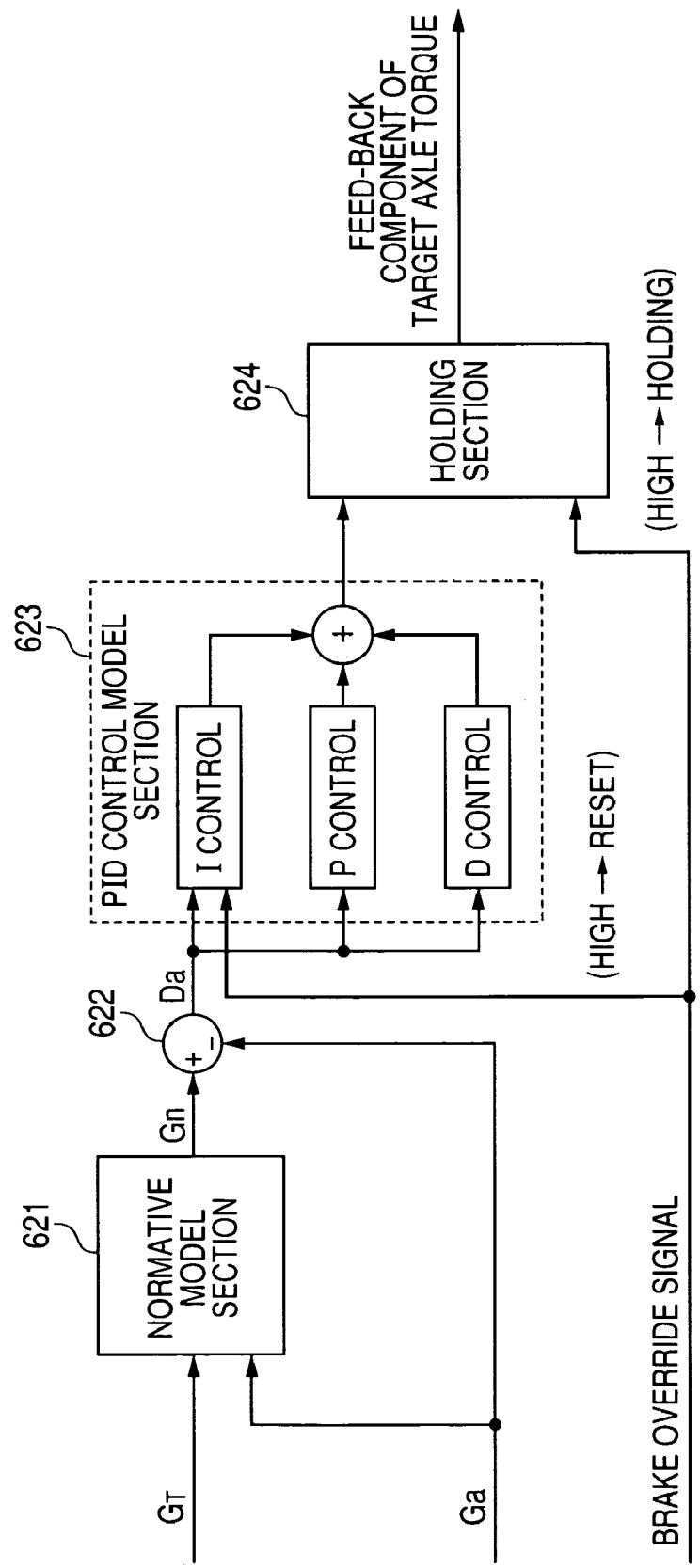
FIG. 8 is a view explaining the feed-back calculation performed in an FB torque calculating unit shown in FIG. 2.

Next, the feed-back calculation performed in the FB torque calculating unit 62 will be described with reference to FIG. 8 and FIG. 9. FIG. 8 is a view explaining the feed-back calculation performed in the unit 62, while FIG. 9 is a view explaining the state transition according to a normative model used in the feed-back calculation.

The FB torque calculating unit 62 performs the feed-back calculation depending on the level of the brake override signal determined by the unit 58. As shown in FIG. 8, the unit 62 has a normative model section 621 for setting the target acceleration Gt as a normative acceleration Gn in the running control state according to a normative model and setting the actual acceleration Ga of the vehicle determined based on data of the wheel speed sensor 22 as a normative acceleration Gn in the brake override state according to the normative model, a subtracting section 622 for subtracting the actual acceleration Ga from the normative acceleration Gn to calculate an acceleration difference Da, a PID control model section 623 for performing PID (proportional integral and differential) control based on the acceleration difference Da according to a PID control model to calculate a feed-back component of the target axle torque, and a holding section 624 for receiving the calculated feed-back component, promptly outputting the feed-back component calculated in the running control state to the adder 63, holding the feed-back component, calculated in the running control state just before the start of the brake override state, during the brake override state, outputting this held feed-back component during the brake override state.

Figure 9:
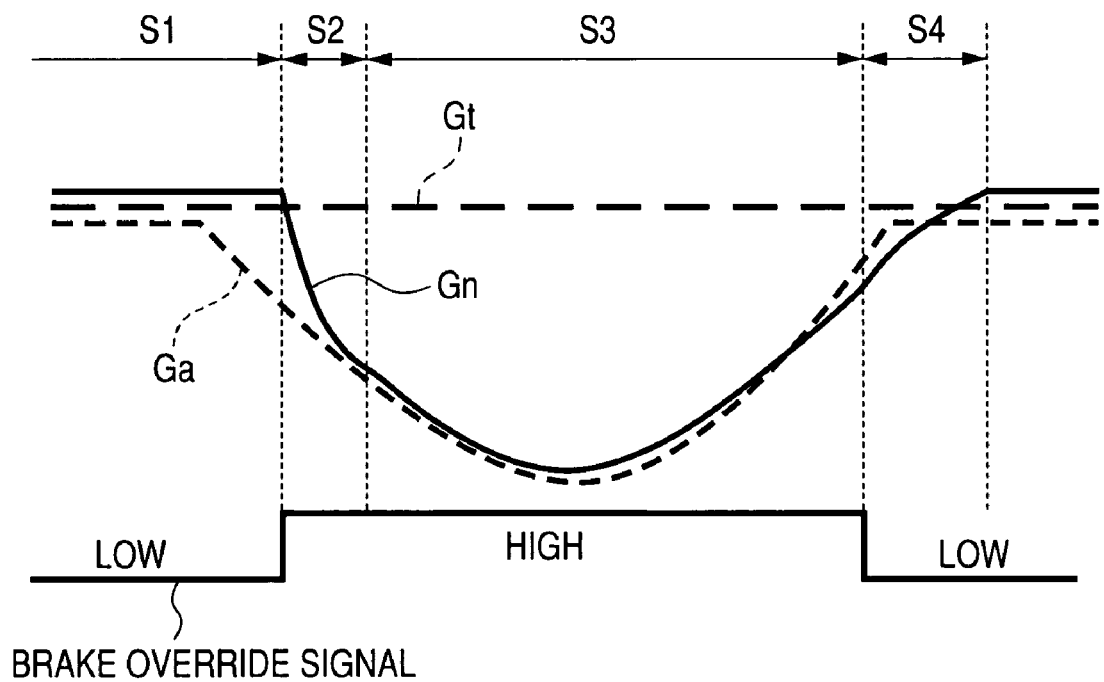
FIG. 9 is a view explaining the state transition according to a normative model of the FB torque calculating unit.

As shown in FIG. 9, in the normative model, the first to fourth model states exist in the unit 62. In response to the brake override signal set at the low level, the normative acceleration Gn is set to be equal to the target acceleration Gt (first model state S1). In response to the change in the level of the brake override signal from the low level to the high level, the value of the normative acceleration Gn is gradually changed from the value of the target acceleration Gt to the value of the actual acceleration Ga (second model state S2). After the normative acceleration Gn becomes equal to the actual acceleration Ga, the normative acceleration Gn is maintained at the actual acceleration Ga (third model state S3). In response to the change in the level of the brake override signal from the high level to the low level, the value of the normative acceleration Gn is gradually changed from the value of the actual acceleration Ga to the value of the target acceleration Gt (fourth model state S4). The first and fourth model states S1 and S4 are set during the running control state (the low level of the brake override signal), and the second and third model states S2 and S3 are set during the brake override state (the high level of the brake override signal).

When the value of the normative acceleration Gn is changed from the value of the target acceleration Gt to the value of the actual acceleration Ga in the second model state S2, this change is not discontinuously performed, but is continuously and smoothly performed by performing the filtering process in a filter until the difference between the values Gn and Ga becomes zero. In the same manner, the change of the normative acceleration Gn from the actual acceleration Ga to the target acceleration Gt in the fourth model state S4 is continuously and smoothly performed by performing the filtering process until the difference between the values Gn and Gt becomes zero. During the third model state S3, the acceleration difference Da received in the PID control model section 623 becomes zero.

As shown in FIG. 8, during the running control state, the model section 623 performs the PID control based on the acceleration difference Da to calculate a feed-back component of the target axle torque. Therefore, the actual acceleration Ga of the vehicle, driven or braked by the target axle torque including the feed-back component, can be reliably controlled to the target acceleration Gt or be reliably changed to follow the target acceleration Gt.

When the brake override state is started, the value of the feed-back component obtained just before the start of the brake override state is held in the section 624 to fix the value of the feed-back component during the stoppage of the running control. The unit 62 continues outputting this held feed-back component during the brake override state, so that the feed-back component of the target axle torque is fixed during the brake override state. In contrast, the feed-forward component is calculated in the unit 61 to run the vehicle against the running resistance, and this running resistance is changeable during the running of the vehicle. Therefore, the feed-forward component is changeable with the running resistance, and the target axle torque (i.e., the target oil pressure shown in FIG. 3) is only changed with the feed-forward component during the brake override state. In this case, the timing at which the unit 58 judges the release of the brake override state can be only changed with the running resistance. Accordingly, even when the running resistance is considerably changed during the stoppage of the running control, the unit 58 can detect this release at a time appropriate to the restart of the running control.

In the PID control of the section 623, a proportional (P) component, an integral (I) component and a differential (D) component are calculated and summed up to obtain a feed-back component of the target axle torque. To smoothly restart the running control without a rapid acceleration of the vehicle, the feed-back component should be substantially set at zero at the restart time of the running control. To reliably set the feed-back component at zero at the restart time of the running control, it is preferred that the P, I and D components obtained in the feed-back calculation are, respectively, reset at zero during the stoppage of the running control.

In this embodiment, because the normative acceleration Gn is set at the actual acceleration Ga according to the normative model during the brake override state, the acceleration difference Da inputted to the section 623 is set at zero. Therefore, it is not required to reset the P and D components at zero during the brake override state. Therefore, the PID control is performed during the brake override state without resetting the P and D components, and the P and D components are calculated.

In contrast, although the normative acceleration Gn is set at the actual acceleration Ga according to the normative model during the brake override state, the I component calculated in the PID control during the brake override state inevitably contains the feed-back component calculated before the start of the brake override state. Assuming that the I component calculated in the PID control is not reset at the restart time of the running control, the feed-back component equal to zero cannot be obtained at the restart of the running control. Therefore, in this embodiment, the I component is not calculated during the brake override state, and the I component is reset at zero at the restart time of the running control. Accordingly, the feed-back component can be reliably set at zero at the restart time of the running control, and the running control can be smoothly restarted without a rapid acceleration of the vehicle.

The reason that the normative acceleration Gn is changed from the target acceleration Gt to the actual acceleration Ga when the brake override state is started will be described in more detail. Assuming that the normative acceleration Gn is always set at the target acceleration Gt while resetting the P, I and D components in the PID control at zero during the brake override state, the output of the P, I and D components calculated in the PID control is started after the restart of running control. However, the difference between the target acceleration Gt and the actual acceleration Ga sometimes becomes large at the restart of the running control. In this case, the value of the feed-back component of the target axle torque is rapidly increased after the restart of the running control. Therefore, there is a high probability that the feed-back component composed of the P, I and D components becomes excessively increased. Accordingly, the change of the normative acceleration Gn according to the normative model has effectiveness.

In this embodiment, the unit 62 performs the feed-back control based on the difference between the target acceleration and the actual acceleration. However, the unit 62 may perform the feed-back control based on the difference between the target speed and the actual speed to perform the running control. In this case, in response to the stoppage of the running control, the normative speed is changed from the target speed to the actual speed.

Figure 10A:
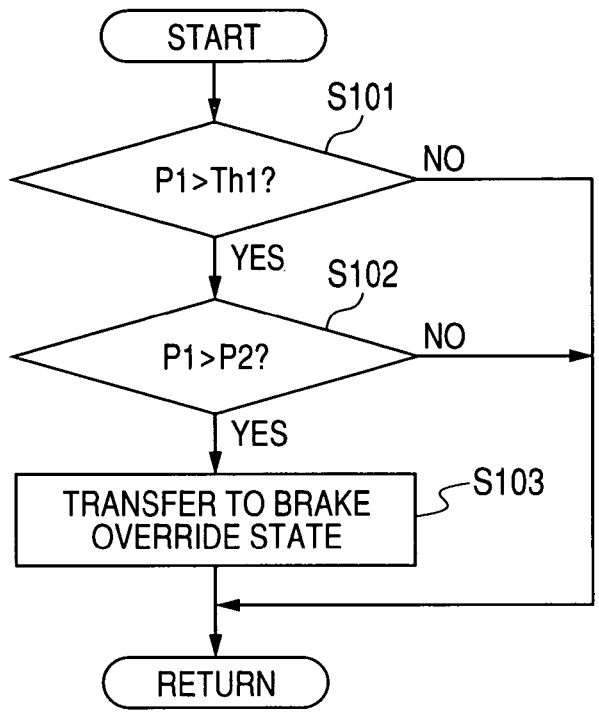
FIG. 10A is a flow chart of the brake override transfer judgment performed in a braking operation mediating unit shown in FIG. 2.
Figure 10B:
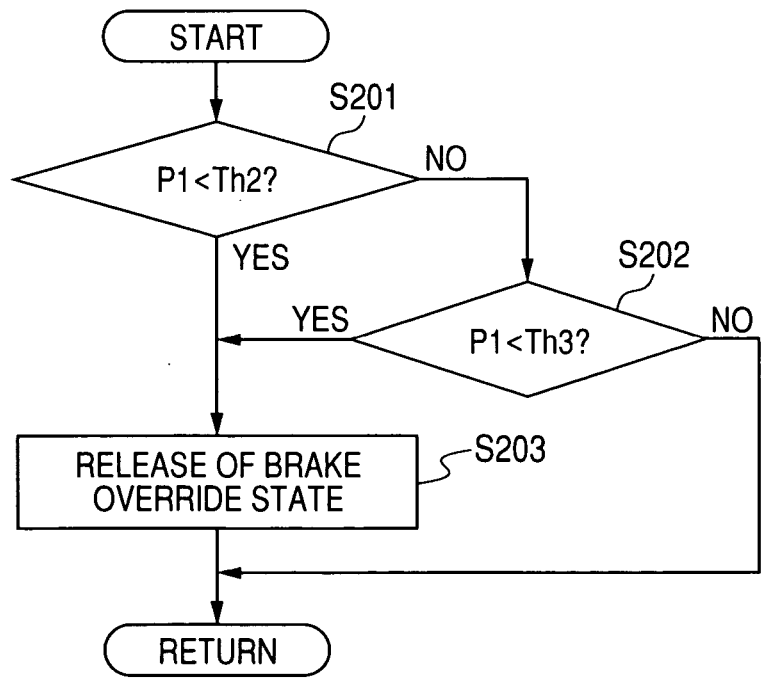
FIG. 10B is a flow chart of the brake override release judgment performed in the braking operation mediating unit shown in FIG. 2.

Next, the processing performed in the running control ECU 20 will be described with reference to FIG. 10A, FIG. 10B and FIG. 11. FIG. 10A is a flow chart of brake override transfer judgment performed in the braking operation mediating unit 58, while FIG. 10B is a flow chart of brake override release judgment performed in the unit 58.

When the ECU 20 is performing the running control for the engine ECU 30 and the brake ECU 40, the unit 58 periodically performs the brake override transfer judgment shown in FIG. 10A to judge whether or not the ECU 20 should be transferred to the brake override state to stop the running control. In contrast, during the stop of the running control in the brake override state, the unit 58 periodically performs the brake override release judgment shown in FIG. 10B to judge whether or not the ECU 20 should release or end the brake override state to restart the running control.

As shown in FIG. 10A, when the brake override transfer judgment is started, at step S101, the unit 58 judges whether or not the operating oil pressure P1 exceeds the braking operation judging threshold Th1 (refer to FIG. 3). When the operating oil pressure P1 does not exceed the threshold Th1, the unit 58 judges that, because the driver performs no braking operation, the running control should be continued. Therefore, this transfer judgment is ended.

In contrast, when the operating oil pressure P1 exceeds the threshold Th1 (YES at step S101), the unit 58 judges that the driver performs the braking operation. Then, at step S102, the unit 58 judges whether or not the operating oil pressure P1 exceeds the target oil pressure P2 (refer to FIG. 3). When the operating oil pressure P1 does not exceed the target oil pressure P2, the unit 58 judges that the braking operation of the driver is not sufficient to override the running control. Therefore, this transfer judgment is ended.

In contrast, when the operating oil pressure P1 exceeds the target oil pressure P2 (YES at step S102), the unit 58 judges that the braking operation of the driver should override the running control. Then, at step S103, the unit 58 judges that the ECU 20 should be transferred to the brake override state, and the ECU 20 sets the brake override signal to the high level. Therefore, the ECU 20 is transferred to the brake override state to stop the running control.

After the transfer to the brake override state, the brake override release judgment is started. As shown in FIG. 10B, at step S201, the unit 58 judges whether or not the operating oil pressure P1 is lower than the brake override state releasing threshold Th2 (refer to FIG. 3). When the operating oil pressure P1 is not lower than the threshold Th2, the unit 58 judges that the operating oil pressure P1 is still sufficiently high to override the running control. Then, at step S202, the unit 58 judges whether or not the operating oil pressure P1 is lower than the braking operation release judging threshold Th3. When the operating oil pressure P1 is not lower than the threshold Th3, the unit 58 judges that the braking operation of the driver is still continued. Therefore, the unit 58 judges that the brake override state should be continued, and this release judgment is ended.

In contrast, when the operating oil pressure P1 is lower than the threshold Th2 or the threshold Th3 (YES at step S201 or S202), the unit 58 judges that the ECU 20 should release the brake override state or the braking operation of the driver is ended. Then, at step S203, the unit 58 sets the brake override signal to the low level to release the brake override state. Therefore, the ECU 20 is set to the running control state to restart the running control. Thereafter, the ECU 20 starts the brake override transfer judgment shown in FIG. 10A.

Next, the vehicle speed adjusting process performed in the target axle torque calculating unit 52 will be described with reference to FIG. 11. FIG. 11 is a flow chart showing the vehicle speed adjusting process performed in the unit 52 of the ECU 20.

Figure 11:
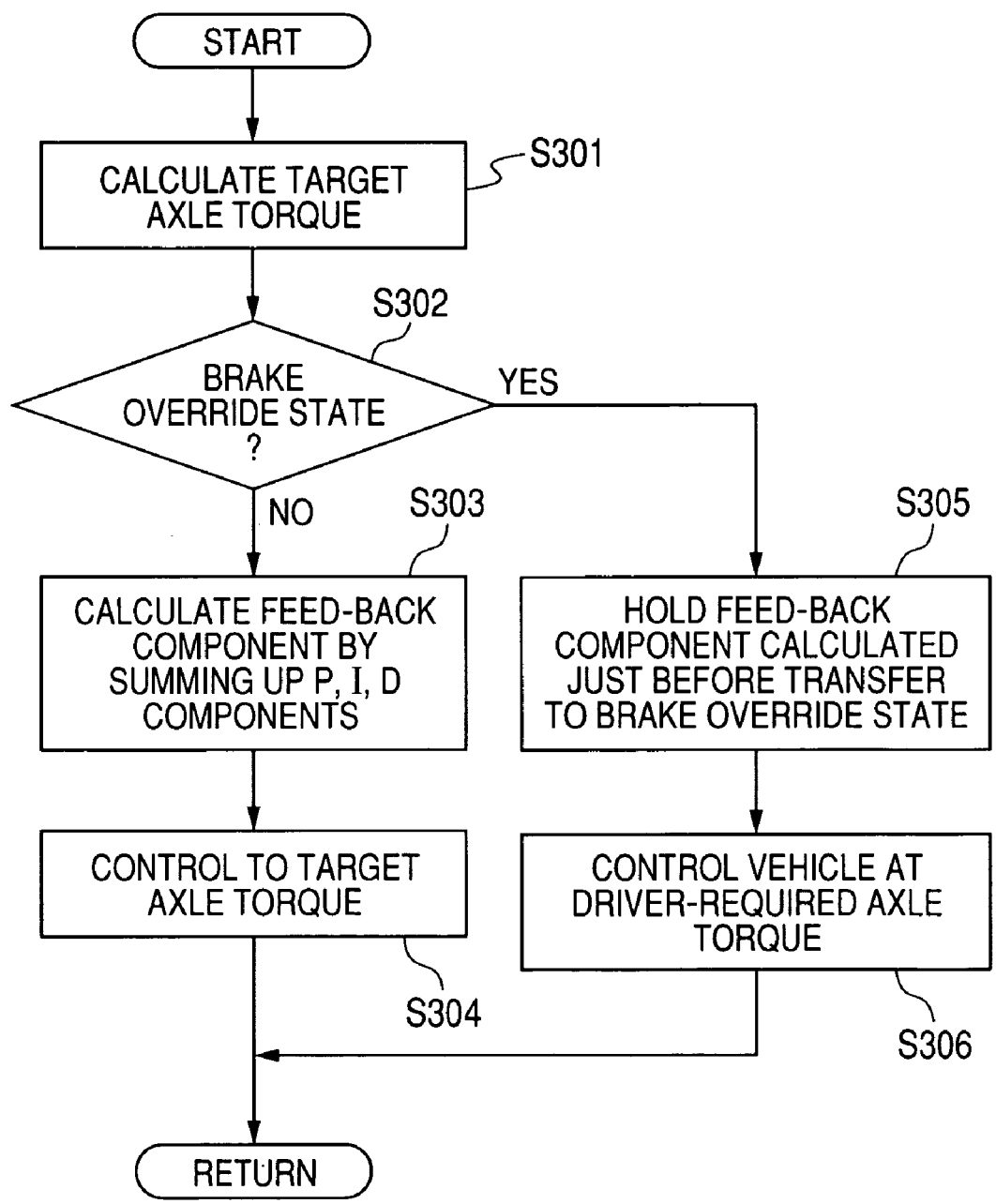
FIG. 11 is a flow chart showing the vehicle speed adjusting process performed in a target axle torque calculating unit shown in FIG. 2.

As shown in FIG. 11, at step S301, the unit 61 of the ECU 20 calculates a target axle torque. At step S302, the unit 62 judges whether or not the ECU 20 is in the brake override state. This judgment is performed based on the brake override signal determined by the judgments shown in FIG. 10A and FIG. 10B. When the ECU 20 is not set in the brake override state but is set in the running control state (NO at step S302), at step S303, the unit 62 calculates the P, I and D components in the PID control and sums up the components to obtain a feed-back component. Then, at step S304, the unit 56 or 59 of the ECU 20 outputs a control signal indicating the target axle torque calculated at step S301 to the ECU 30 or the ECU 40 to control the axle torque of the vehicle to the target axle torque. Therefore, the engine or the braking device of the vehicle is operated under control of the ECU 30 or the ECU 40 to drive or brake the vehicle at the target axle torque, and the vehicle is run at the target speed.

In contrast, when the ECU 20 is set in the brake override state (YES at step S302), at step S305, the unit 62 holds the feed-back component calculated in the running control state just before the transfer to the brake override state and performs the PID control to calculate the P and I components while resetting the I component at zero without calculating the I component. Then, at step S306, the unit 56 or 59 produces a control signal which indicates the driver-required driving or braking axle torque determined from the stroke position of the accelerator pedal or the operating oil pressure P1 and outputs this signal to the ECU 30 or the ECU 40. Therefore, the engine or the braking device of the vehicle is operated under control of the ECU 30 or the ECU 40 to accelerate or decelerate the vehicle at the driver-required driving axle torque or braking axle torque. For example, the vehicle is decelerated in response to the braking operation of the driver.

In this apparatus 5 described above, effects are obtained as follows.

In this embodiment, the FF torque calculating unit 61 calculates a feed-forward component, required to run the vehicle at the target speed against the running resistance, as a target axle torque. This running resistance is caused by running of the vehicle and is changed with running circumstances of the vehicle. When the target axle torque denotes a target braking axle torque (or a control-required braking force), the brake driver model performing unit 57 calculates a driver-required braking axle torque (i.e., driver-required braking force) from the position of the brake pedal detected in the sensor 25. When the unit 58 judges that the driver-required braking axle torque is smaller than the target braking axle torque, the effectuating unit 59 performs the running control for the vehicle to brake the vehicle by the target braking axle torque. Therefore, the vehicle can continue running at the target speed. When the unit 58 judges that the driver-required braking axle torque becomes higher than the target braking axle torque, the unit 59 stops the running control. Therefore, the vehicle is manually braked by the driver-required braking axle torque by the driver. When the driver-required braking axle torque exceeding the target braking axle torque is decreased to be lower than a predetermined braking axle torque, the unit 58 judges that the braking operation is released. When the unit 58 judges that the driver-required braking axle torque exceeding the target braking axle torque is decreased to be lower than the target braking axle torque or when the unit 58 judges the release of the braking operation, the unit 59 restarts the running control.

Therefore, even when the running resistance is changed during the running of the vehicle, the target axle torque is changed with the running resistance. In this case, the timing at which the unit 58 judges that the driver-required braking axle torque becomes lower than the target braking axle torque is changed in accordance with the running resistance.

FIG. 12A is a view exemplarily showing the restart timing of the running control when the vehicle is run on a non-inclined road, FIG. 12B is a view exemplarily showing the restart timing of the running control when the road gradient is increased during the stoppage of the running control, and FIG. 12C is a view exemplarily showing the restart timing of the running control when the road gradient is decreased during the stoppage of the running control.

Assuming that only the hill climbing resistance is changed in the running resistance, the target axle torque calculated in the unit 61 is changed with the road gradient. Further, when the unit 58 compares the driver-required braking axle torque with the target braking axle torque, the target axle torque has a negative value. As shown in FIG. 12A, when the vehicle is run on a non-inclined road or when the road gradient at the stop time T1 of the running control is the same as the road gradient at the restart time T2 of the running control, the target axle torque at the restart time T2 is the same as that at the stop time T1. However, as shown in FIG. 12B, when the road gradient is increased during the stoppage of the running control, the absolute value of the target axle torque (i.e., the target braking axle torque) at the restart time T3 becomes smaller than that at the stop time T1. Therefore, the restart time T3 becomes later than the restart time T2. In contrast, as shown in FIG. 12C, when the road gradient is decreased during the stoppage of the running control, the absolute value of the target axle torque at the restart time T4 becomes smaller than that at the stop time T1. Therefore, the restart time T4 becomes earlier than the restart time T2.

Accordingly, even when the running resistance is considerably changed during the stoppage of the running control, the running control can be restarted at a time which is appropriate to the restart of the running control, and the target driving or braking axle torque provided by the vehicle at the restart time can be appropriately set at the value corresponding to the running resistance to run the vehicle at the target speed against the running resistance. That is, the running control apparatus 5 can appropriately restart the running control in accordance with running circumstances of the vehicle so as to smoothly restart the running control without causing discomfort to the driver.

The unit 61 adopts a hill climbing resistance, changed with a gradient of a road on which the vehicle is run, as the running resistance. Accordingly, even when the road gradient is changed during the stoppage of the running control, the apparatus 5 can appropriately restart the running control to brake the vehicle at the target braking axle torque corresponding to the running resistance at the restart time.

When this road gradient is out of a limited range specified by law, the unit 61 does not adopt the hill climbing resistance as the running resistance or adopts the hill climbing resistance, based on a value of the limited range nearest to the road gradient, as the running resistance. Accordingly, the target axle torque can be appropriately set.

A sensor detects the road gradient, and the unit 61 receives a signal of the road gradient from the sensor and removes a noise included in the signal in a filtering process. Accordingly, the unit 61 can estimate the running resistance with high precision.

Especially, the unit 61 performs the filtering process for the signal of the road gradient at a first time constant to obtain a filtered signal, calculates a difference between the signal of the road gradient and the filtered signal, sets a second time constant such that the second time constant is heightened as the difference becomes small, and performs the filtering process for the signal of the road gradient at the second time constant. Accordingly, the unit 61 can effectively remove the noise from the signal while correctly estimating a change of the road gradient.

The FB torque calculating unit 62 performs a feed-back calculation during the running control of the units 58 and 59 to add a feed-back component obtained in the feed-back calculation to the target axle torque and to control the vehicle, braked by the target axle torque containing the feed-back component, to the target acceleration, and fixes the feed-back component at a value, obtained just before the stoppage of the running control, during the stoppage of the running control such that the units 58 and 59 restart the running control according to the target axle torque containing the feed-forward component and the feed-back component of the fixed value.

Because the target axle torque contains the feed-back component, the ECU 20 of the apparatus 5 can reliably control the vehicle to the target speed. Further, because the feed-back component contained in the target axle torque is fixed during the stoppage of the running control, the target axle torque is only changed with the running resistance. Accordingly, as compared with a case where the units 58 and 59 starts the running control according to the target axle torque containing a feed-back component changeable during the stoppage of the running control, the running control can be restarted at an appropriate timing.

Especially, the feed-back calculation is performed based on a difference between an actual acceleration of the vehicle and a normative acceleration to reduce the difference to zero in the vehicle braked by the target axle torque containing the feed-back component. The FB torque calculating unit 62 sets the target acceleration as the normative acceleration during the running control of the running control unit, changes the normative acceleration from the target acceleration to the actual acceleration when the running control is stopped, and continuously changes the normative acceleration from the actual acceleration to the target acceleration when the running control is restarted.

Because the normative acceleration is changed to the actual acceleration when the running control is stopped, the difference is set at zero during the stoppage of the running control. Accordingly, when the running control is restarted, the feed-back component obtained in the feed-back calculation can be gradually increased without being rapidly increased just after the restart of the running control.

Further, the normative acceleration is set at the actual acceleration during the brake override state. Therefore, when the running control is restarted, the normative acceleration can be continuously changed from the actual acceleration to the target acceleration. Accordingly, the rapid acceleration of the vehicle just after the restart of the running control can be prevented, and the running speed of the vehicle can be gradually and smoothly changed after the restart of the running control.

These effects obtained by changing the normative acceleration from the target acceleration to the actual acceleration in response to the stoppage of the running control will be described in more detail with reference to FIG. 13A and FIG. 13B. FIG. 13A is a view exemplarily showing the difference between the normative acceleration Gn and the actual acceleration Ga when the normative acceleration Gn is fixed to the target acceleration Gt, while FIG. 13B is a view exemplarily showing the actual acceleration Ga changed to follow the normative acceleration Gn according to this embodiment.

As shown in FIG. 13A, assuming that the normative acceleration Gn is fixed to the target acceleration Gt without being changed from the target acceleration Gt to the actual acceleration Ga in response to the stoppage of the running control, the normative acceleration Gn is always set to follow the target acceleration Gt. In response to a driver-requested acceleration (denoting deceleration) Gd corresponding to the driver-requested braking axle torque, the ECU 20 is set in the brake override state in the period of time from the time T10 to T11. At the restart time T11 of the running control after the brake override state, the actual acceleration Ga set by the driver's requirement is differentiated from the target acceleration Gt, so that the difference between the actual acceleration Ga and the normative acceleration Gn sometimes becomes large. In this case, when the running control is restarted, the feed-back component calculated in the PID control is rapidly or discontinuously increased. Therefore, this rapid increase of the feed-back component causes discomfort to the driver.

In contrast, as shown in FIG. 13B, the normative acceleration Gn is changed at the time T12 from the target acceleration Gt to the actual acceleration Ga in response to the stoppage of the running control, and the normative acceleration Gn is continuously and smoothly changed from the actual acceleration Ga to the target acceleration Gt in the period from the time T13 to the time T14. Therefore, the actual acceleration Ga is substantially equal to the normative acceleration Gn just before the restart time T13 of the running control and is continuously changed after the restart time T13 to follow the continuous change of the normative acceleration Gn. In this case, when the running control is restarted, the rapid or discontinuous increase of the feed-back component can be prevented.

The unit 62 may continuously change the normative acceleration from the target acceleration to the actual acceleration in response to the stoppage of the running control.

Further especially, the unit 62 performs an integral control based on the difference as the feed-back calculation during the running control to calculate an integral component as the feed-back component, and resets the integral component at zero during the stoppage of the running control unit.

In the feed-back calculation during the running control, the proportional control, the integral control and the differential control are normally performed. To smoothly restart the running control without a rapid acceleration of the vehicle, the feed-back component should be substantially set at zero at the restart time of the running control. To reliably set the feed-back component at zero at the restart time of the running control, it is preferred that a proportional component, an integral component and a differential component obtained in the feed-back calculation are, respectively, reset at zero during the stoppage of the running control. However, because the normative acceleration is set at the actual acceleration during the stoppage of the running control, it is not required to reset any of the proportional and differential components. In contrast, because the integral component calculated during the stoppage of the running control contains a value based on the acceleration difference Da set before the stoppage of the running control, it is required to reset the integral component during the stoppage of the running control. Because the integral component is reset during the stoppage of the running control, the feed-back component can reliably become zero at the restart time of the running control. Accordingly, the running control can be smoothly restarted without a rapid acceleration of the vehicle.

The unit 58 judges, when the driver-required braking axle torque is larger than a braking judging axle torque, that the braking operation is performed, and stops the running control, when the driver-required braking axle torque is larger than the target braking axle torque and the braking judging axle torque.

Even when the driver-required braking axle torque is near to zero, the unit 58 sometimes misjudges due to the zero point shifting that this torque is set at a comparatively large value. Assuming that the unit 58 judges on the stoppage of the running control regardless of the braking judging axle torque, the unit 58 sometimes stops the running control by mistake. However, the unit 58 judges whether or not the driver-required braking axle torque is larger than the braking judging axle torque. Accordingly, the unit 58 can perform the judgment on the stoppage of the running control with high precision.

The unit 58 sets the brake override state releasing threshold Th2 lower than the target oil pressure corresponding to the target braking axle torque, and the unit 58 judges, when the operating oil pressure exceeding the target oil pressure in response to the driver's braking operation is decreased to be lower than the threshold Th2, that the driver-required braking axle torque becomes lower than the target braking axle torque.

Because the target oil pressure for the judgment on the stoppage of the running control differs from the threshold Th2 for the judgment on the restart of the running control, the hunting such as a repeated alternation of the stoppage of the running control and the restart of the running control can be prevented.

A running control program is executed in a computer of the ECU 20 to operate the apparatus 5. This program has a first routine for the operation of the target axle torque calculating block 71, a second routine for the operation of the brake driver model performing unit 57, and a third routine for the operation of the units 58 and 59. In the first routine, a target axle torque, required to control a vehicle to a target running state, is calculated such that the target axle torque contains a feed-forward component required to run the vehicle at the target running state against a running resistance caused by the vehicle. In the second routine, a driver-required braking axle torque of the vehicle, required by a braking operation performed by a driver of the vehicle is calculated. In the third routine, control data is produced such that the apparatus 5 operated according to the control data performs a running control for the vehicle to run the vehicle by the target axle torque calculated in the first program portion, stops the running control, when the driver-required braking axle torque is higher than the target braking axle torque calculated in the first program portion, to run the vehicle at the driver-required braking axle torque, judges, when the driver-required braking axle torque is lower than a braking operation release judging axle torque, that the braking operation is released, and restarts the running control when the driver-required braking axle torque becomes lower than the target braking axle torque or the braking operation release judging axle torque.

Therefore, the apparatus 5 can be operated by using the program.

This embodiment should not be construed as limiting the present invention to the structure of the embodiment, and the structure of this invention may be combined with that based on the prior art. For example, in this embodiment, the running resistance is composed of the air resistance, rolling resistance, acceleration resistance and hill climbing resistance. However, the running resistance may composed of some of these resistances or may be additionally composed of another resistance or other resistances.

Further, when the operating oil pressure becomes lower than the threshold Th2 or Th3, the unit 58 judges that the brake override state should be released (see FIG. 3), and the brake override state is released or ended. However, when the target axle torque calculated in the unit 52 or the target acceleration calculated in the 51 has a negative value so as to brake the vehicle by the target braking torque, the block 71 indicates that the vehicle should be decelerated, and the unit 58 sets the target oil pressure at a value corresponding to the calculated target axle torque or the calculated target acceleration. In this case, when the operating oil pressure (i.e. driver-required braking force) becomes lower than the target oil pressure or the threshold Th2 (i.e., the control-required braking force), the unit 58 may judge that the brake override state is released. In contrast, when the target axle torque or the target acceleration has a positive value so as to drive the vehicle by the target driving torque, the block 71 indicates that the vehicle should be driven or accelerated, and no target oil pressure is set. In this case, when the operating oil pressure (i.e. driver-required braking force) becomes lower than the braking operation release judging threshold Th3, the unit 58 may judge that the brake override state is released.

What is claimed is:

1. A running control apparatus, comprising:
   a control-required driving or braking force calculating unit that calculates a control-required driving force or a control-required braking force, required to control a vehicle to a target running state, from a running resistance caused by the vehicle such that the driving or braking force contains a feed-forward component required to run the vehicle at the target running state against the running resistance;
   a driver-required braking force calculating unit that calculates a driver-required braking force of the vehicle required by a braking operation which is performed by a driver of the vehicle; and
   a running control unit that performs a running control for the vehicle so as to run the vehicle by the control-required driving or braking force calculated by the control-required driving or braking force calculating unit;
   wherein the running control unit
   stops the running control, when the driver-required braking force caused by the driver's braking operation becomes higher than the control-required braking force,
   judges the braking operation being released when the driver-required braking force caused by the driver's braking operation becomes lower than a braking operation release judging threshold, and
   restarts the running control so as to run the vehicle by the control-required driving or braking force including a running resistance at the time of restarting, when the driver-required braking force caused by the driver's braking operation becomes lower than the control-required braking force or the braking operation release judging threshold.

2. The apparatus according to claim 1, wherein the control-required driving or braking force calculating unit adopts at least a hill climbing resistance, based on a gradient of a road on which the vehicle is run, as the running resistance.

3. The apparatus according to claim 2, wherein, when the road gradient is out of a limited range specified by law, the control-required driving or braking force calculating unit does not adopt the hill climbing resistance as the running resistance or adopts the hill climbing resistance, based on a value of the limited range nearest to the road gradient, as the running resistance.

4. The apparatus according to claim 2, wherein a sensor detects the road gradient, and the control-required driving or braking force calculating unit receives a signal of the road gradient from the sensor and removes noise included in the signal in a filtering process.

5. The apparatus according to claim 4, wherein the control-required driving or braking force calculating unit performs the filtering process for the signal of the road gradient at a first time constant to obtain a filtered signal, calculates a difference between the signal of the road gradient and the filtered signal, sets a second time constant such that the second time constant is heightened as the difference becomes small, and performs the filtering process for the signal of the road gradient at the second time constant.

6. The apparatus according to claim 1, wherein the control-required driving or braking force calculating unit performs a feed-back calculation during the running control of the running control unit to add a feed-back component obtained in the feed-back calculation to the control-required driving or braking force and to control the vehicle, driven or braked by the control-required driving or braking force containing the feed-back component, to the target running state, and fixes the feed-back component at a value, obtained just before the running control unit stops the running control, during the stoppage of the running control such that the running control unit restarts the running control according to the control-required driving or braking force containing the feed-forward component and the feed-back component of the fixed value.

7. The apparatus according to claim 6, wherein the feed-back calculation is performed based on a difference between an actual acceleration of the vehicle and a normative acceleration to reduce the difference to zero in the vehicle driven or braked by the control-required driving or braking force containing the feed-back component, and the control-required driving or braking force calculating unit sets a target acceleration representing the target running state as the normative acceleration during the running control of the running control unit, changes the normative acceleration from the target acceleration to the actual acceleration when the running control unit stops the running control, and continuously changes the normative acceleration from the actual acceleration to the target acceleration when the running control unit restarts the running control.

8. The apparatus according to claim 7, wherein the control-required driving or braking force calculating unit performs an integral control based on the difference as the feed-back calculation during the running control to calculate an integral component as the feed-back component, and resets the integral component at zero at a restart time of the running control.

9. The apparatus according to claim 7, wherein the control-required driving or braking force calculating unit performs a proportional control, an integral control and a differential control based on the difference as the feed-back calculation during the running control to calculate a sum of a proportional component, an integral component and a differential component as the feed-back component, and resets only the integral component at zero at a restart time of the running control.

10. The apparatus according to claim 1, wherein the running control unit judges, when the driver-required braking force is higher than a braking operation judging threshold, that the braking operation is performed, and stops the running control, when the driver-required braking force is higher than the braking operation judging threshold and the control-required braking force.

11. The apparatus according to claim 1, wherein the running control unit sets a first judging threshold lower than the control-required braking force, judges, when the driver-required braking force higher than the control-required braking force is decreased to be lower than the first judging threshold, that the driver-required braking force becomes lower than the control-required braking force.

12. The apparatus according to claim 1, wherein the running control unit restarts the running control when the vehicle is braked by the control-required braking force and the driver-required braking force becomes lower than the control-required braking force, and restarts the running control when the vehicle is driven by the control-required driving force and the driver-required braking force becomes lower than the braking operation release judging threshold.

13. The apparatus according to claim 1, wherein the running resistance is composed of a rolling resistance changed with a weight of the vehicle or a rolling resistance coefficient, an air resistance changed with a running speed of the vehicle or a projected area of the vehicle on its front plane, a hill climbing resistance changed with a gradient of a road, on which the vehicle is run, and an acceleration resistance changed with an acceleration or deceleration of the vehicle.

14. A running control program, executed in a computer mounted on a vehicle, for a running control apparatus, comprising:
   a control-required driving or braking force calculating routine that calculates a control-required driving force or a control-required braking force, required to control a vehicle to a target running state, from a running resistance caused by the vehicle such that the driving or braking force contains a feed-forward component required to run the vehicle at the target running state against the running resistance;
   a driver-required braking force calculating routine that calculates a driver-required braking force of the vehicle required by a braking operation which is performed by a driver of the vehicle; and
   a running control routine that performs a running control for the vehicle so as to run the vehicle by the control-required driving or braking force calculated in the control-required driving or braking force calculating routine;
   wherein the running control routine
   stops the running control when the driver-required braking force caused by the driver's braking operation becomes higher than the control-required braking force,
   judges the braking operation being released when the driver-required braking force caused by the driver's braking operation becomes lower than a braking operation release judging threshold, and
   restarts the running control so as to run the vehicle by the control-required driving or braking force including a running resistance at the time of restarting, when the driver-required braking force caused by the driver's braking operation becomes lower than the control-required braking force or the braking operation release judging threshold.

15. A running control apparatus, comprising:
   a control-derived target axle torque calculating unit configured to calculate a control-derived target axle torque, required to control a vehicle to a target speed, based on a running resistance caused by the vehicle such that the control-derived target axle torque contains a feed-forward component required to run the vehicle at the target speed against the running resistance;
   a driver-derived braking torque calculating unit configured to calculate a driver-derived braking torque of the vehicle caused by a braking operation performed by a driver of the vehicle; and
   a running control unit configured to perform a running control for the vehicle so as to run the vehicle by the control-derived target axle torque calculated by the control-derived target axle torque calculating unit,
   wherein the running control unit is further configured to
   stop the running control, when the driver-derived braking torque rises above a first threshold braking torque,
   judge that the braking operation has ended when the driver-derived braking torque falls below a second threshold braking torque, and
   restart the running control so as to run the vehicle by the control-derived target axle torque, including a running resistance at the time of restarting, when the driver-derived braking torque falls below either the first threshold braking torque or the second threshold braking torque.

16. The apparatus according to claim 15, wherein the control-derived target axle torque calculating unit is further configured to adopt at least a hill climbing resistance, based on a gradient of a road on which the vehicle is run, as the running resistance.

17. The apparatus according to claim 16, further comprising
   a sensor configured to detect a road gradient,
   wherein the control-derived target axle torque calculating unit is further configured to receive a signal of the road gradient from the sensor and to remove noise included in the signal in a filtering process.

18. The apparatus according to claim 15, wherein the control-derived target axle torque calculating unit is further configured to
   perform a feed-back calculation during the running control of the running control unit to add a feed-back component obtained in the feed-back calculation to the control-derived target axle torque and to control the vehicle, driven or braked by the control-derived target axle torque, containing the feed-back component, to the target speed, and
   fix the feed-back component at a value, obtained just before the running control unit stops the running control, during the stoppage of the running control such that the running control unit restarts the running control according to the control-derived target axle torque, containing the feed-forward component and the feed-back component of the fixed value.

19. The apparatus according to claim 15, wherein the running control unit is further configured to
   judge that a braking operation is being performed when the driver-derived braking torque is higher than a third threshold braking torque,
   stop the running control when the driver-required braking torque is higher than the first threshold braking torque and the third threshold braking torque.

20. The apparatus according to claim 15, wherein the running control unit is further configured to
   restart the running control when the vehicle is braked by the control-derived target axle torque and the driver-derived braking torque drops below the first threshold braking torque, and
   restart the running control when the vehicle is driven by the control-derived target axle torque and the driver-derived braking torque drops below the second threshold braking torque.

* * * * *